(12) United States Patent
Kawakita et al.

(10) Patent No.: US 11,250,144 B2
(45) Date of Patent: Feb. 15, 2022

(54) APPARATUS, METHOD, AND PROGRAM PRODUCT FOR OPERATING A DISPLAY IN PRIVACY MODE

(71) Applicant: LENOVO (Singapore) PTE. LTD., New Tech Park (SG)

(72) Inventors: Koji Kawakita, Yokohama (JP); David W. Douglas, Cary, NC (US); Tin-Lup Wong, Chapel Hill, NC (US)

(73) Assignee: LENOVO (Singapore) PTE. LTD., New Tech Park (SG)

( * ) Notice: Subject to any disclaimer, the term of this patent is extended or adjusted under 35 U.S.C. 154(b) by 381 days.

(21) Appl. No.: 16/370,688

(22) Filed: Mar. 29, 2019

(65) Prior Publication Data

US 2020/0311290 A1    Oct. 1, 2020

(51) Int. Cl.
| | | |
|---|---|---|
| *G06F 21/60* | (2013.01) | |
| *G09G 5/00* | (2006.01) | |
| *G09G 5/10* | (2006.01) | |
| *G06K 9/00* | (2022.01) | |
| *G06F 21/62* | (2013.01) | |
| *G10L 17/00* | (2013.01) | |

(52) U.S. Cl.
CPC ........ *G06F 21/604* (2013.01); *G06F 21/6245* (2013.01); *G06K 9/00288* (2013.01); *G09G 5/003* (2013.01); *G09G 5/10* (2013.01); *G10L 17/00* (2013.01); *G09G 2320/068* (2013.01); *G09G 2320/0626* (2013.01); *G09G 2354/00* (2013.01); *G09G 2358/00* (2013.01)

(58) Field of Classification Search
CPC .......... G06F 3/013; G06F 3/01; G06F 3/0425; G06F 3/011; G06F 3/005; G06F 3/012; G06F 21/31; H04N 21/64307; H04N 21/812; H04N 21/23412; H04N 21/23418; H04N 21/23424; H04N 21/235; H04N 21/2381; H04N 21/435; H04N 21/4622; H04N 21/4722; H04N 21/4725
See application file for complete search history.

(56) References Cited

U.S. PATENT DOCUMENTS

| | | | | |
|---|---|---|---|---|
| 2013/0057553 | A1* | 3/2013 | Chakravarthula | .... G06F 3/0484 345/468 |
| 2014/0157424 | A1* | 6/2014 | Lee | ...... G06F 21/6245 726/26 |
| 2016/0210473 | A1* | 7/2016 | Cohen | ...... G06F 21/10 |
| 2017/0236494 | A1* | 8/2017 | Sommerlade | ......... H04W 12/06 345/660 |
| 2020/0293754 | A1* | 9/2020 | Huang | ............... G06K 9/00597 |

* cited by examiner

*Primary Examiner* — Sanjiv D. Patel
(74) *Attorney, Agent, or Firm* — Kunzler Bean & Adamson; Bruce R. Needham

(57) ABSTRACT

Apparatus, methods, and program products are disclosed for operating a display in privacy mode. One apparatus includes a processor and a memory that stores code executable by the processor. The code is executable by the processor to detect an individual within an unauthorized zone in the field of view of a camera. The code is executable by the processor to operate a display in privacy mode in response to detecting the individual within the unauthorized zone. Methods and computer program products that perform the functions of the apparatus are also disclosed.

20 Claims, 21 Drawing Sheets

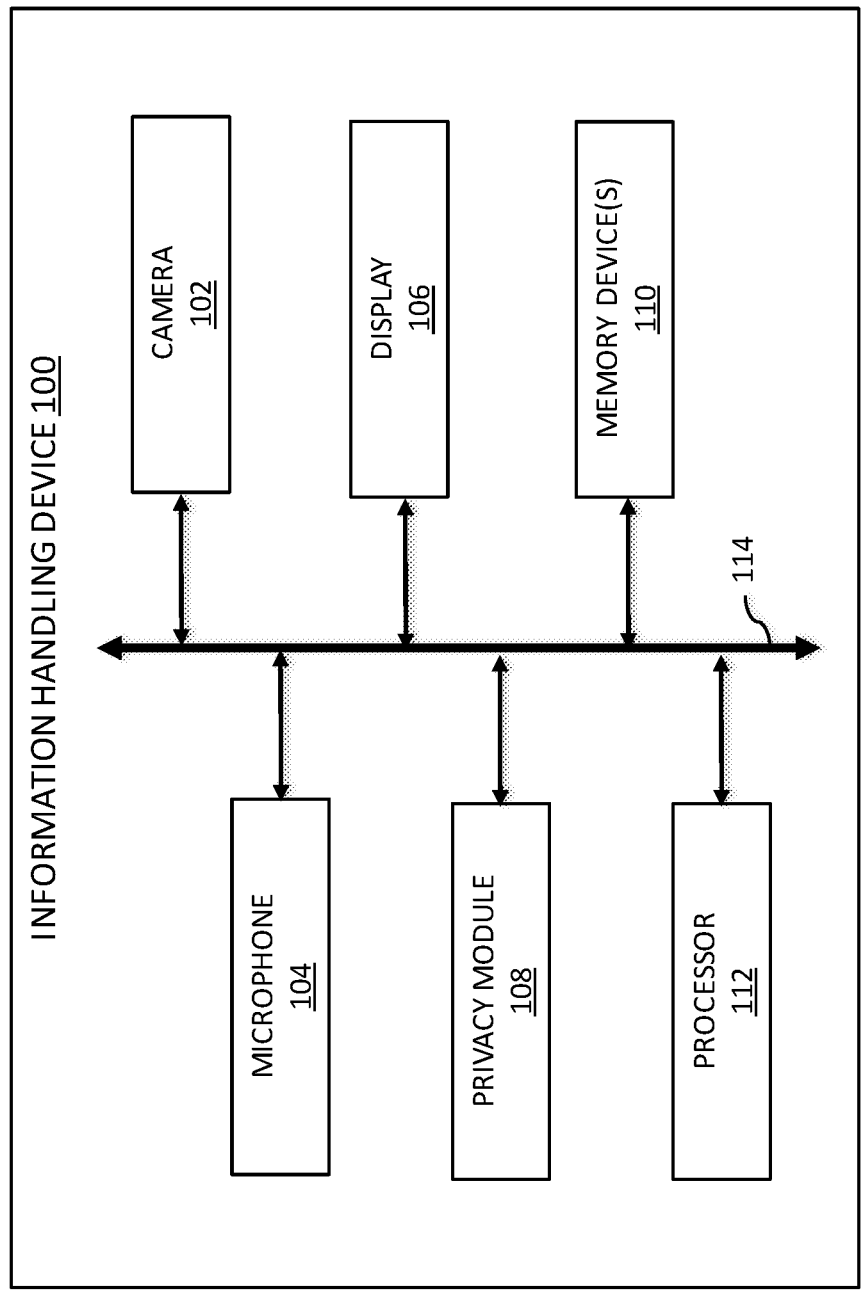

APPARATUS, METHOD, AND PROGRAM PRODUCT FOR OPERATING A DISPLAY IN PRIVACY MODE

FIELD

The subject matter disclosed herein relates to computing displays and more particularly relates to operating a display in privacy mode.

DESCRIPTION OF THE RELATED ART

Information handling devices, such as desktop computers, laptop computers, tablet computers, smart phones, optical head-mounted display units, smart watches, smart devices, voice-controlled electronic devices, televisions, streaming devices, etc., are ubiquitous in society. These information handling devices generally include a display that can be the target of an unauthorized individual trying to view or spy on the contents displayed thereon while an authorized user or individual is using a particular information handling device. Conventional displays do not address some user scenarios in which an unauthorized individual is spying on the contents of a computing display and/or misidentifies an authorized individual that is collaborating with an authorized user.

BRIEF SUMMARY

An apparatus for operating a display in privacy mode is disclosed. A method and computer program product also perform the functions of the apparatus. In one embodiment, the apparatus includes a processor and a memory that stores code executable by the processor. The code, in various embodiments, is executable by the processor to detect an individual within an unauthorized zone in a field of view of a camera. The code, in certain embodiments, is executable by the processor to operate a display in a privacy mode in response to detecting the individual within the unauthorized zone.

In some embodiments, detecting the individual includes detecting a partial face of the individual within the unauthorized zone. In one embodiment, detecting the partial face includes detecting an eye of the individual within the unauthorized zone.

In various embodiments, the unauthorized zone includes one or more areas in the field of view greater than a predetermined distance behind an authorized user. In one embodiment, the unauthorized zone includes a first area in the field of view that is to a left of the authorized user, a second area in the field of view that is to a right of the authorized user, and/or a third area in the field of view that is above the authorized user.

A method, in one embodiment, includes detecting, by a processor, an individual within an unauthorized zone in a field of view of a camera. In certain embodiments, the method includes operating a display in a privacy mode of operation in response to detecting the individual within the unauthorized zone.

In some embodiments, detecting the individual includes detecting a partial face of the individual within the unauthorized zone. In one embodiment, detecting the partial face includes detecting an eye of the individual within the unauthorized zone.

In various embodiments, the unauthorized zone includes one or more areas in the field of view greater than a predetermined distance behind an authorized user. In one embodiment, the unauthorized zone includes a first area in the field of view that is to a left of the authorized user, a second area in the field of view that is to a right of the authorized user, and/or a third area in the field of view that is above the authorized user.

In one embodiment, a program product includes a computer-readable storage medium that stores code executable by a processor. The executable code, in certain embodiments, includes code to perform detecting, by an information handling device, an individual within an unauthorized zone in a field of view of a camera. The executable code, in various embodiments, includes code to perform operating a display in a privacy mode of operation in response to detecting the individual within the unauthorized zone.

In some embodiments, detecting the individual includes detecting a partial face of the individual within the unauthorized zone. In one embodiment, detecting the partial face includes detecting an eye of the individual within the unauthorized zone.

In various embodiments, the unauthorized zone includes one or more areas in the field of view greater than a predetermined distance behind an authorized user. In one embodiment, the unauthorized zone includes a first area in the field of view that is to a left of the authorized user, a second area in the field of view that is to a right of the authorized user, and/or a third area in the field of view that is above the authorized user.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 1 is a schematic block diagram illustrating one embodiment of an information handling device;

DETAILED DESCRIPTION

Figure 2A:
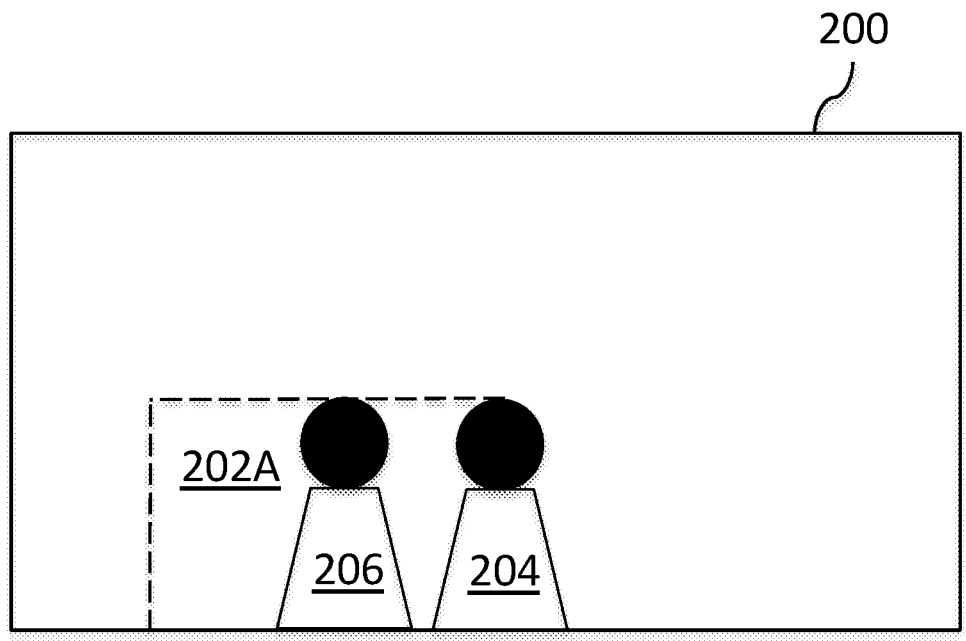
FIGS. 2A through 2G are schematic diagrams illustrating one or more authorized zones within the field of view of a camera included in the information handling device of FIG. 1 in accordance with various embodiments.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer-readable storage devices. Where a module or portions of a module are implemented in software, the software portions are stored on one or more computer-readable storage devices.

Any combination of one or more computer-readable medium may be utilized. The computer-readable medium may be a computer-readable storage medium. The computer-readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram of one embodiment of an information handling device 100. The information handling device 100 may include any suitable computing device that is known or developed in the future. In various embodiments, the information handling device 100 can include a desktop computer, a laptop computer, a personal digital assistant (PDA), a tablet computer, a smart phone, a cellular telephone, a smart television (e.g., televisions connected to the Internet), a set-top box, a game console, a vehicle on-board computer, a streaming device, a smart device, and a digital assistant, etc., among other computing devices that are possible and contemplated herein. In some embodiments, an information handling device 102 can include a wearable device, such as a smart watch, a fitness band, or an optical head-mounted display, etc., among other wearable devices that are possible and contemplated herein.

At least in the illustrated embodiment, an information handling device 100 includes, among other components, a camera 102, a microphone 104, a display 106, a privacy module 108, a set of memory devices 110, and a processor 112 coupled to and/or in communication with one another via a bus 114 (e.g., a wired and/or wireless bus 114).

A camera 102 may include any suitable camera that is known or developed in the future capable of capturing one or more digital images of an environment within the field of view of the camera 102. In various embodiments, the camera 102 can be external to the information handling device 100 and/or incorporated in at least a portion of the information handling device 100.

In some embodiments, the field of view of the camera 102 includes and/or defines one or more authorized zones therein, as discussed elsewhere herein. In additional or alternative embodiments, the field of view of the camera 102 includes and/or defines one or more unauthorized zones therein, as discussed elsewhere herein.

With reference now to FIGS. 2A through 2G, FIGS. 2A through 2G are schematic diagrams illustrating one or more authorized zones 202 within a field of view 200 of a camera 102 included in an information handling device 100 in accordance with various embodiments. FIG. 2A illustrates one embodiment of a field of view 200 of a camera 102 including an authorized zone 202A.

At least in the illustrated embodiment, the authorized zone 202A is defined as an area that is to the left of an authorized user 204 from the perspective of the camera 102. In additional or alternative embodiments, the authorized zone 202A can further be defined as including a depth component within the area to the left of the authorized user 204. In some embodiments, the depth component includes an area to the left of the authorized user 204 that is closer in distance to the camera 102 than the authorized user 204, equal in distance to the camera 102 as the authorized user 204, and/or is within a predetermined distance farther in distance to the camera 102 than the authorized user 204 (e.g., is within a predetermined distance behind the authorized user 204).

Figure 2B:
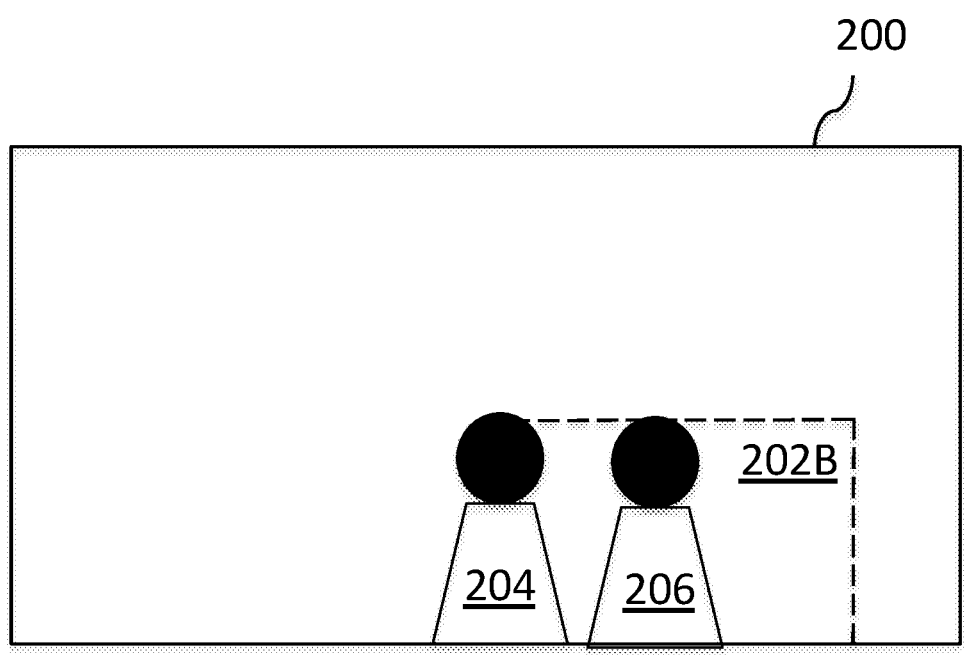

FIG. 2B illustrates another embodiment of the field of view 200 of a camera 102 including an authorized zone 202B. At least in the illustrated embodiment, the authorized zone 202B is defined as an area that is to the right of an authorized user 204 from the perspective of the camera 102. In additional or alternative embodiments, the authorized zone 202B can further be defined as including a depth component within the area to the right of the authorized user 204. In some embodiments, the depth component includes an area to the right of the authorized user 204 that is closer in distance to the camera 102 than the authorized user 204, equal in distance to the camera 102 as the authorized user 204, and/or is within a predetermined distance farther in distance to the camera 102 than the authorized user 204 (e.g., is within a predetermined distance behind the authorized user 204).

Figure 2C:
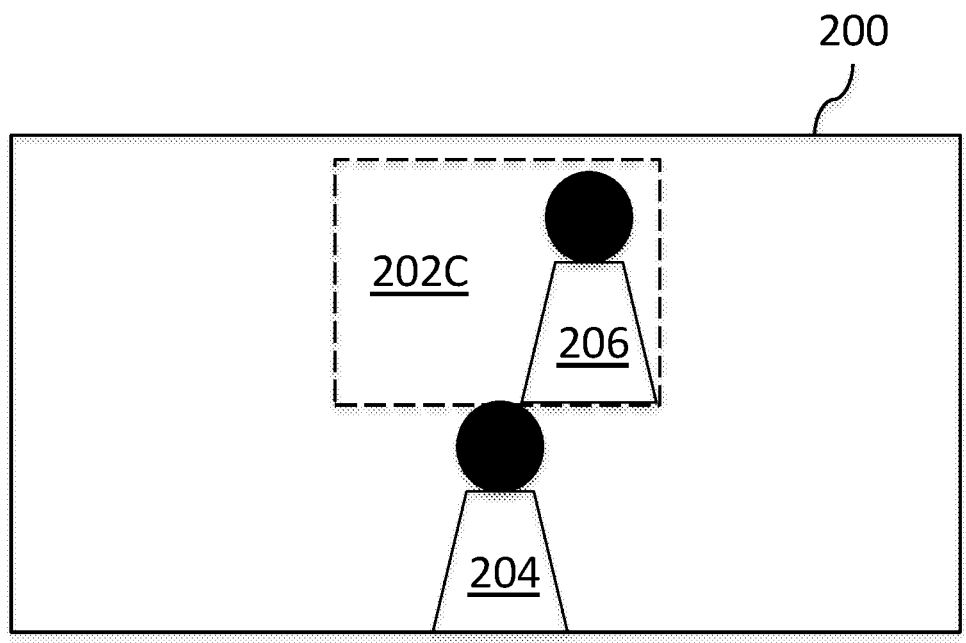

FIG. 2C illustrates yet another embodiment of the field of view of a camera 102 including an authorized zone 202C. At least in the illustrated embodiment, the authorized zone 202C is defined as an area that is above an authorized user 204. In additional or alternative embodiments, the authorized zone 202C can further be defined as including a depth component within the area above the authorized user 204. In some embodiments, the depth component includes an area that is within a predetermined distance farther in distance to the camera 102 than the authorized user 204 (e.g., is within a predetermined distance behind the authorized user 204).

Figure 2D:
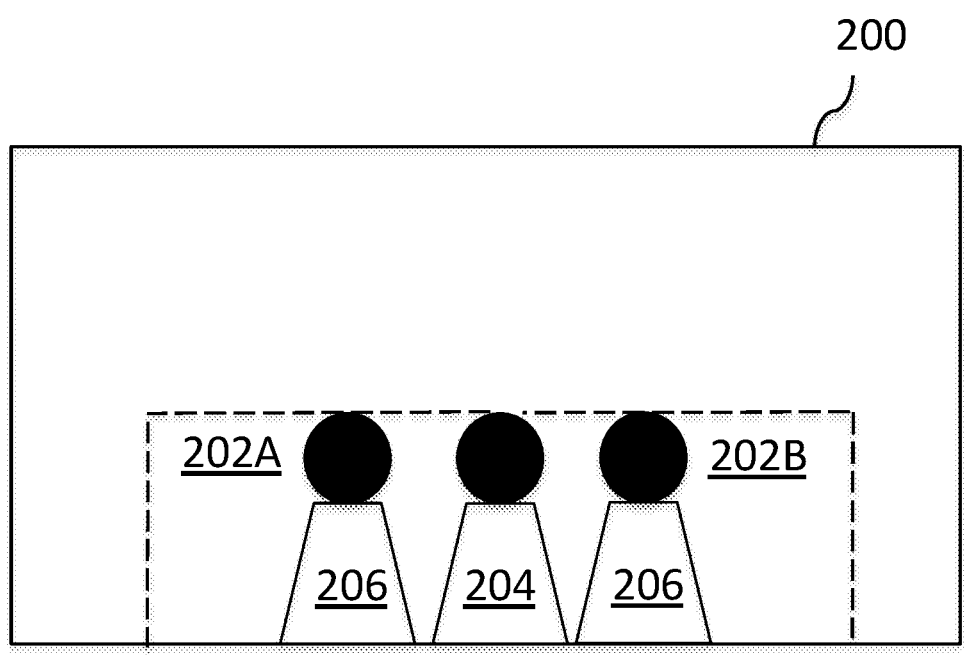
Figure 2E:
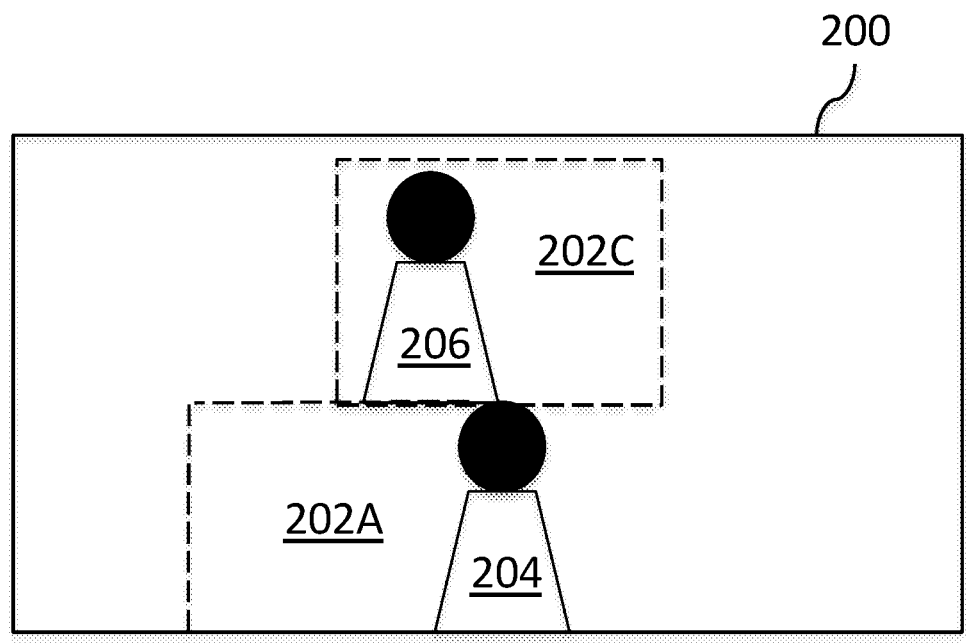
Figure 2F:
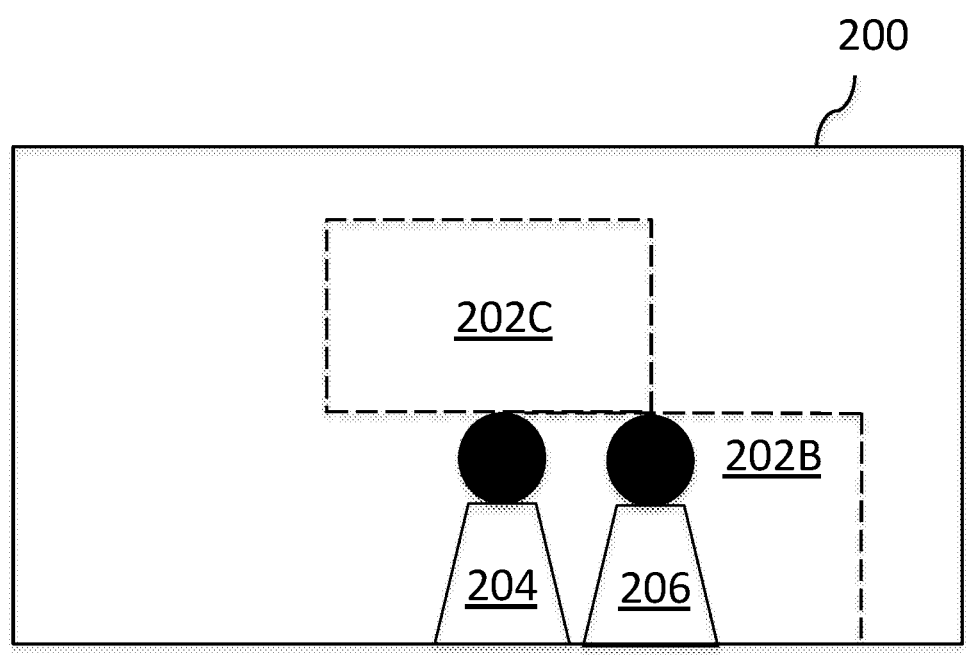
Figure 2G:
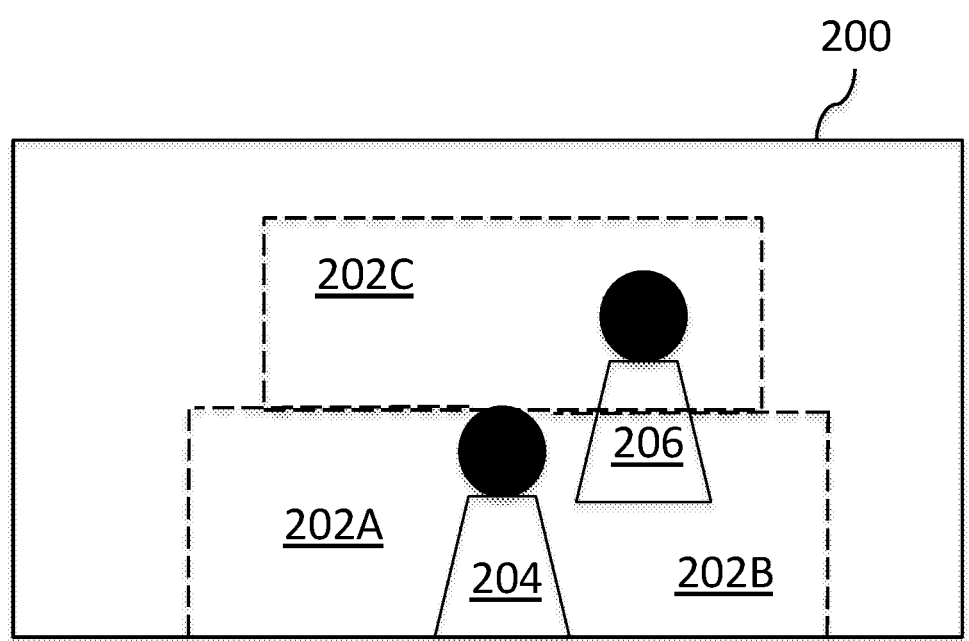

FIG. 2D illustrates one embodiment of the field of view 200 of a camera 102 including authorized zones 202A and 202B similar to the various embodiments discussed elsewhere herein. FIG. 2E illustrates another embodiment of the field of view 200 of a camera 102 including authorized zones 202A and 202C similar to the various embodiments discussed elsewhere herein. FIG. 2F illustrates yet another embodiment of the field of view 200 of a camera 102 including authorized zones 202B and 202C similar to the various embodiments discussed elsewhere herein. FIG. 2G illustrates still another embodiment of the field of view 200 of a camera 102 including authorized zones 202A, 202B, and 202C similar to the various embodiments discussed elsewhere herein.

In various embodiments, a camera 102 is configured to detect an individual 206 in one or more of authorized zones 202A, 202B, and 202C. That is, the camera 102 can detect whether the individual 206 is within authorized zone 202A, 202B, or 202C and/or whether the individual 206 is simultaneously within two of the authorized zones 202A, 202B, and 202C (e.g., authorized zones 202A and 202C or authorized zones 202B and 202C).

In additional or alternative embodiments, a camera 102 is configured to detect multiple individuals 206 in one or more of authorized zones 202A, 202B, and 202C. That is, the camera 102 can detect whether the individuals 206 are within authorized zone 202A, 202B, and/or 202C and/or whether one or more individuals 206 is/are simultaneously within two of the authorized zones 202A, 202B, and 202C (e.g., authorized zones 202A and 202C or authorized zones 202B and 202C).

Figure 3A:
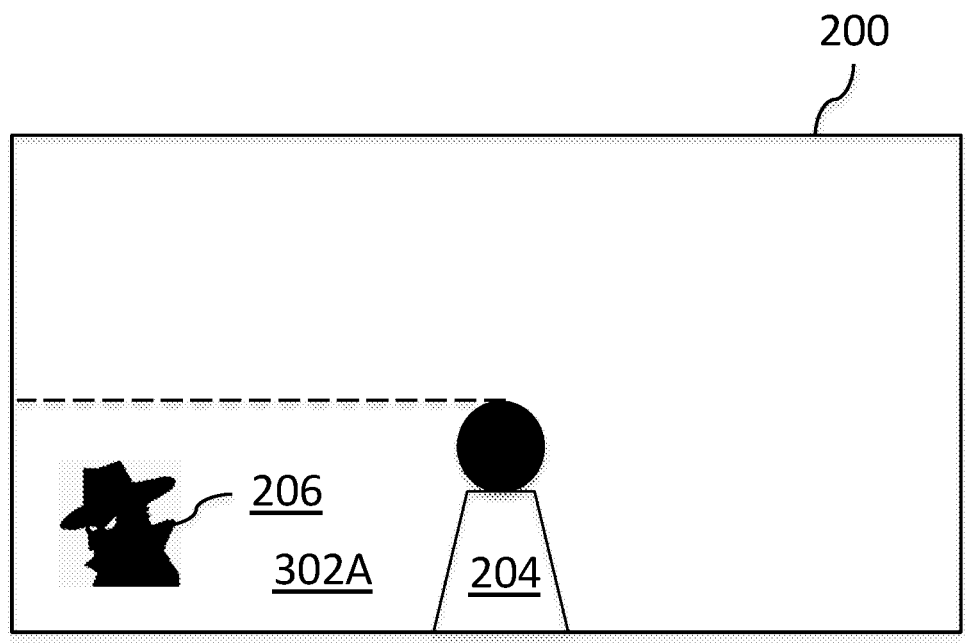
FIGS. 3A through 3G are schematic diagrams illustrating one or more unauthorized zones within the field of view of a camera included in the information handling device of FIG. 1 in accordance with various embodiments.

With reference now to FIGS. 3A through 3G, FIGS. 3A through 3G are schematic diagrams illustrating one or more unauthorized zones 302 within a field of view 200 of a camera 102 included in an information handling device 100 in accordance with various embodiments. FIG. 3A illustrates one embodiment of a field of view 200 of a camera 102 including an unauthorized zone 302A.

At least in the illustrated embodiment, the authorized zone 302A is defined as an area that is to the left of an authorized user 204 from the perspective of the camera 102 that is greater than a predetermined distance away from the camera 102. In additional or alternative embodiments, the unauthorized zone 202A can further be defined as including a depth component within the area to the left of an authorized user 204 that is greater than a predetermined distance behind the authorized user 204.

Figure 3B:
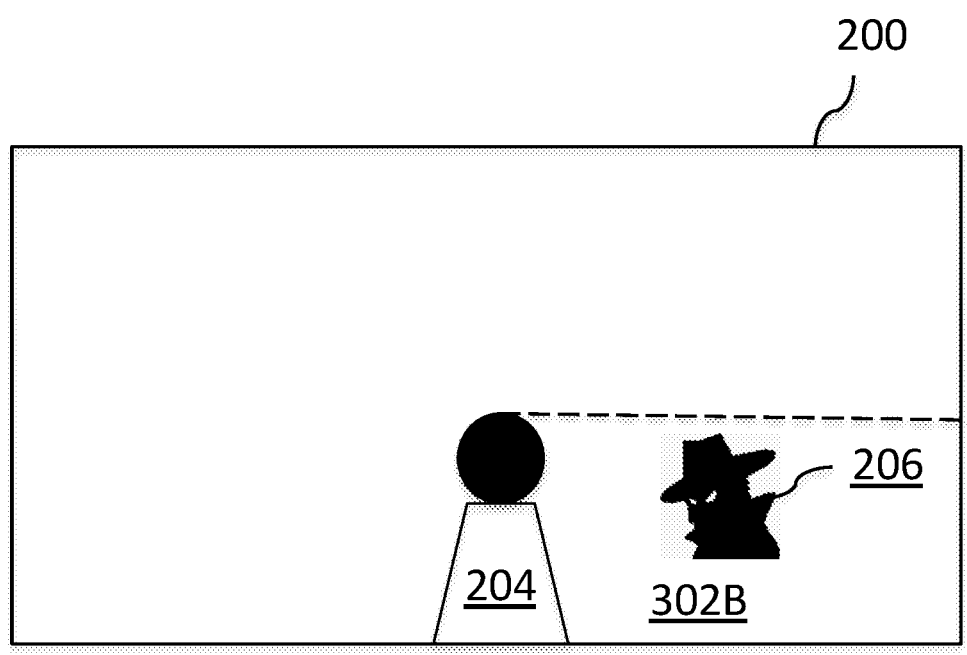

FIG. 3B illustrates another embodiment of a field of view 200 of a camera 102 including an unauthorized zone 302B. At least in the illustrated embodiment, the authorized zone 302B is defined as an area that is to the right of an authorized user 204 from the perspective of the camera 102 that is greater than a predetermined distance away from the camera 102. In additional or alternative embodiments, the unauthorized zone 302B can further be defined as including a depth component within the area to the right of an authorized user 204 that is greater than a predetermined distance behind the authorized user 204.

Figure 3C:
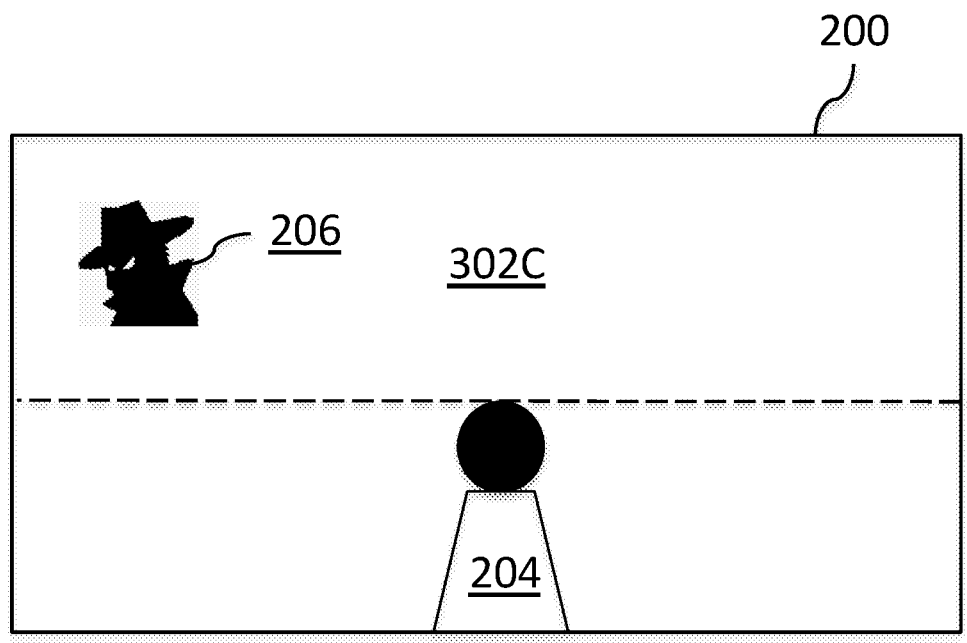

FIG. 3C illustrates another embodiment of a field of view 200 of a camera 102 including an unauthorized zone 302C. At least in the illustrated embodiment, the authorized zone 302C is defined as an area that is above an authorized user 204 that is greater than a predetermined distance away from the camera 102. In additional or alternative embodiments, the unauthorized zone 302B can further be defined as including a depth component within the area above an authorized user 204 that is greater than a predetermined distance behind the authorized user 204.

Figure 3D:
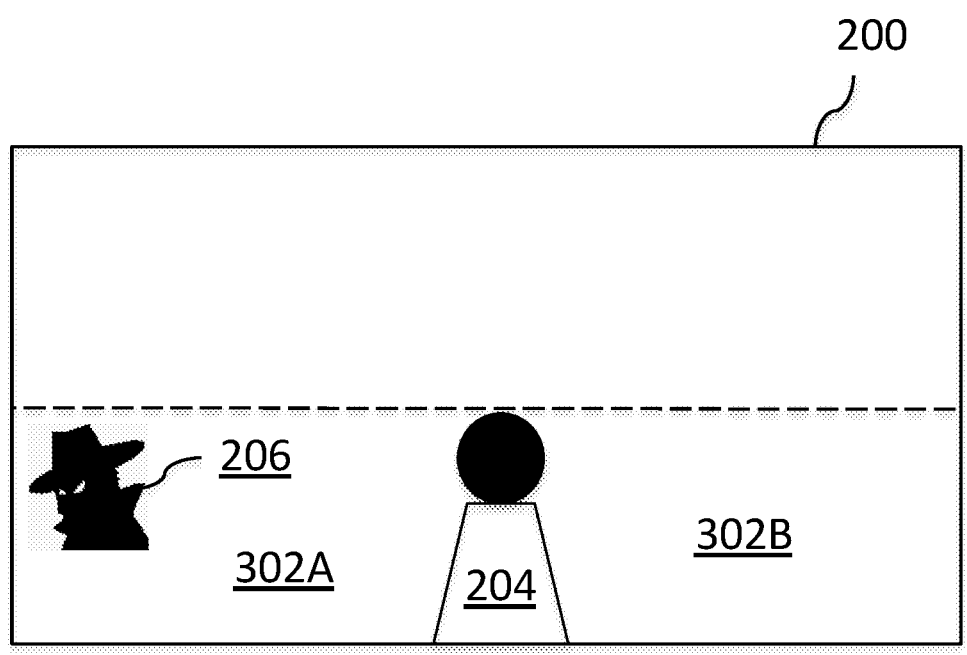
Figure 3E:
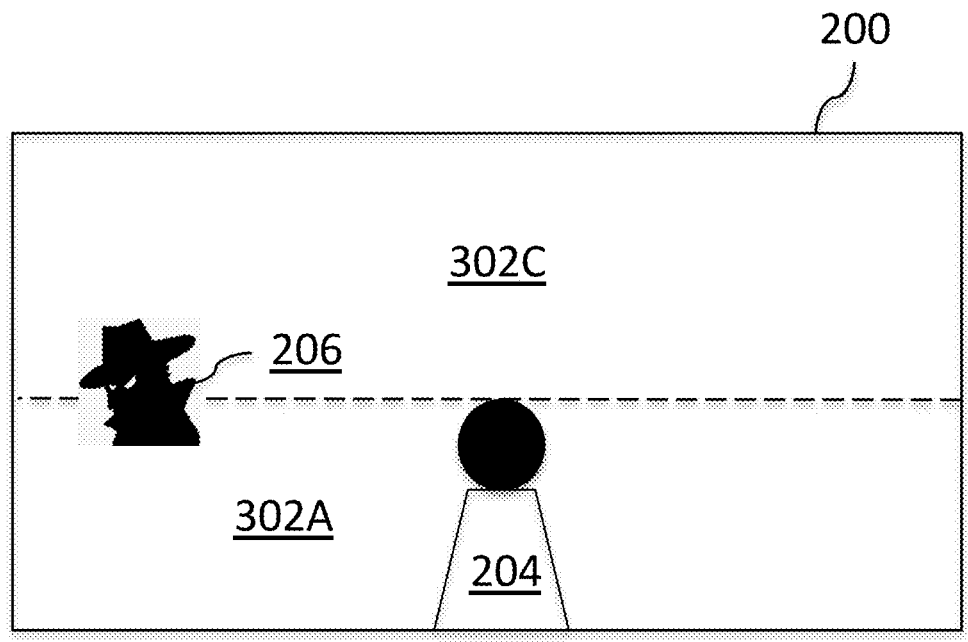
Figure 3F:
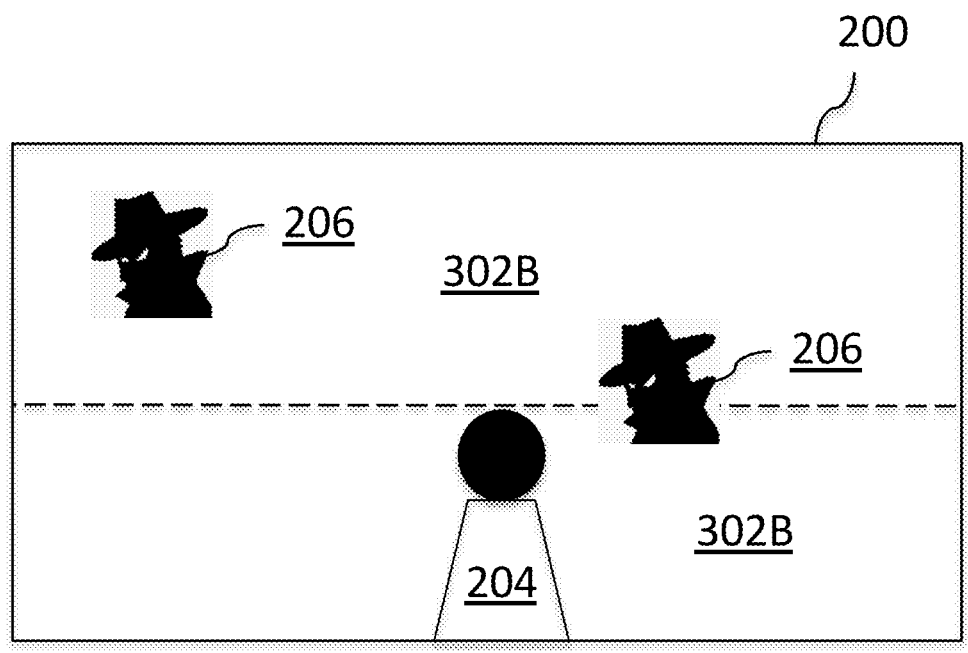
Figure 3G:
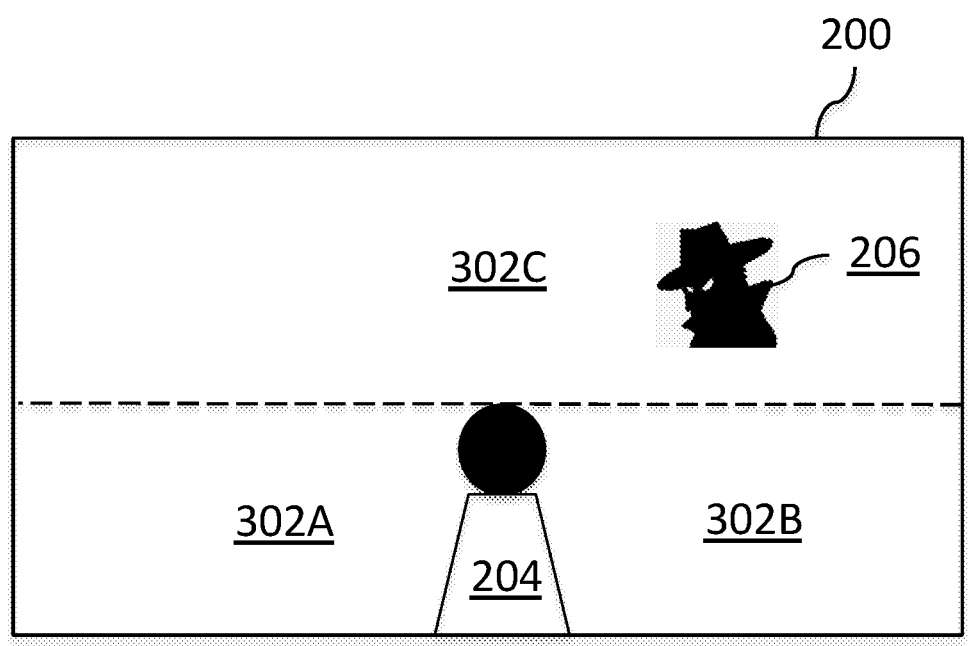
Figure 4A:
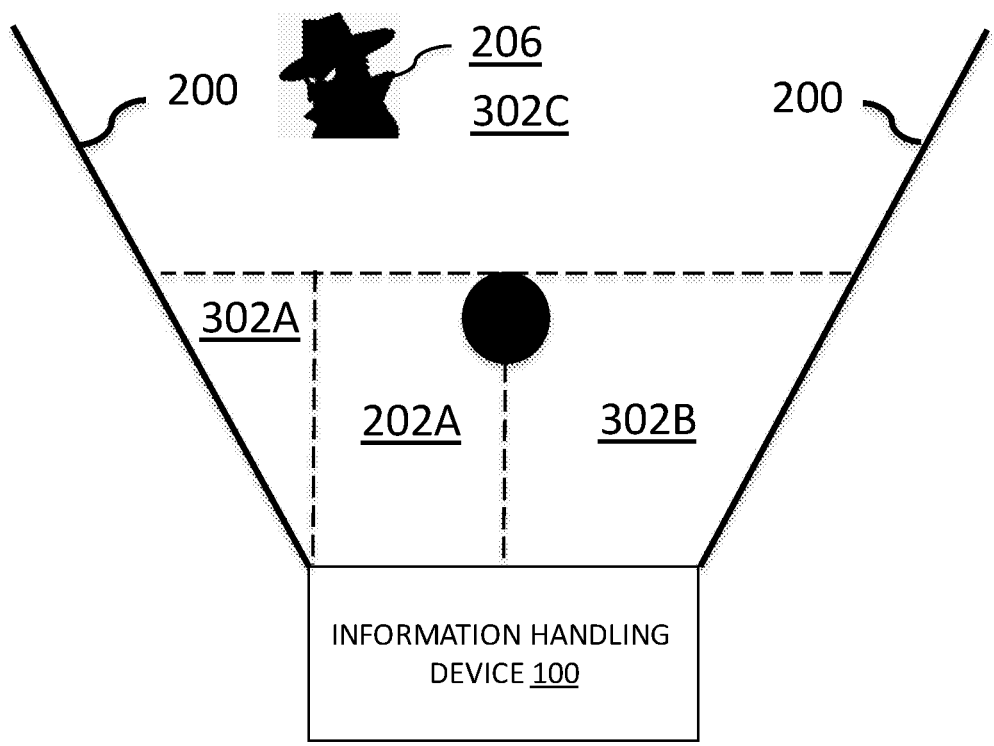
FIGS. 4A through 4G are schematic diagrams illustrating an overhead view of the authorized zones of FIGS. 2A through 2G and the unauthorized zones of FIGS. 3A through 3G.
Figure 4B:
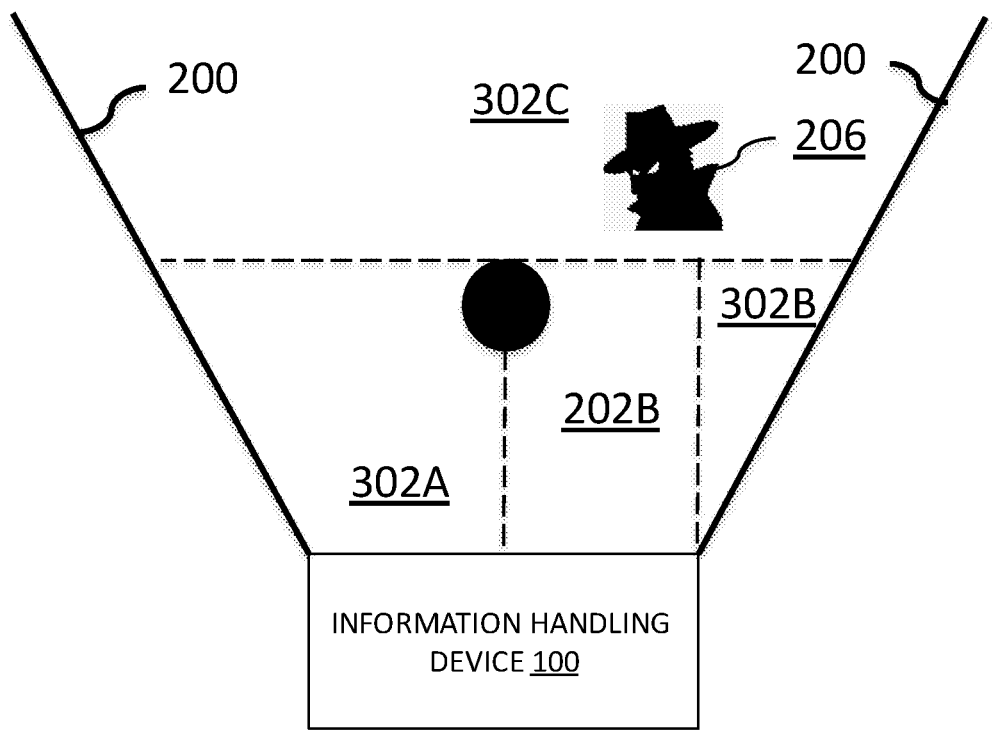
Figure 4C:
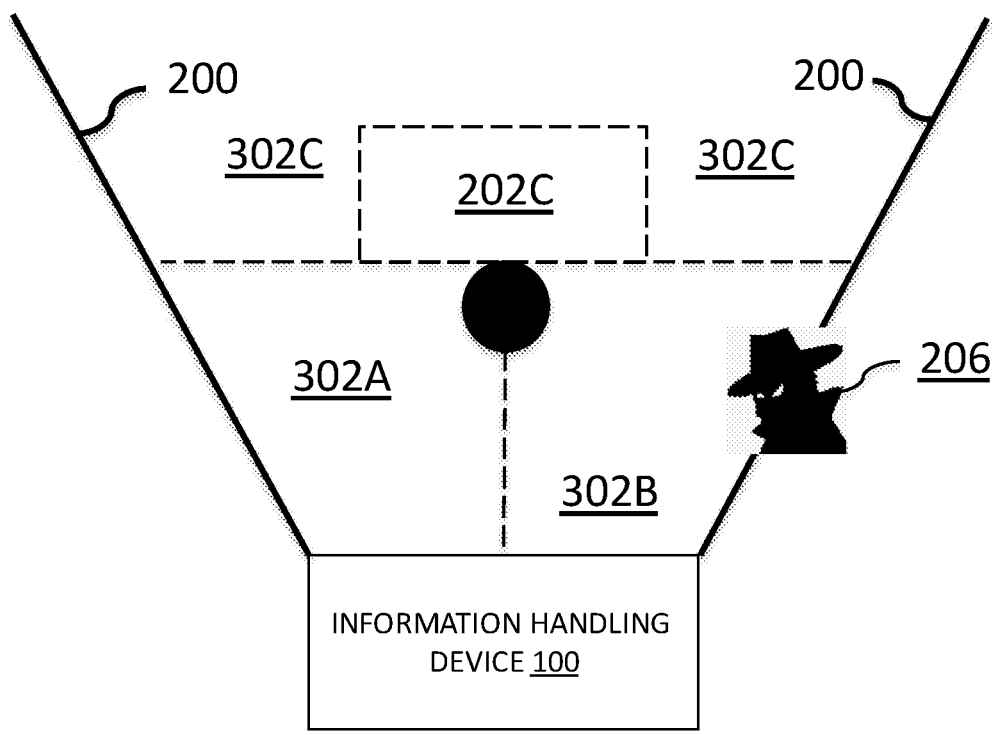
Figure 4D:
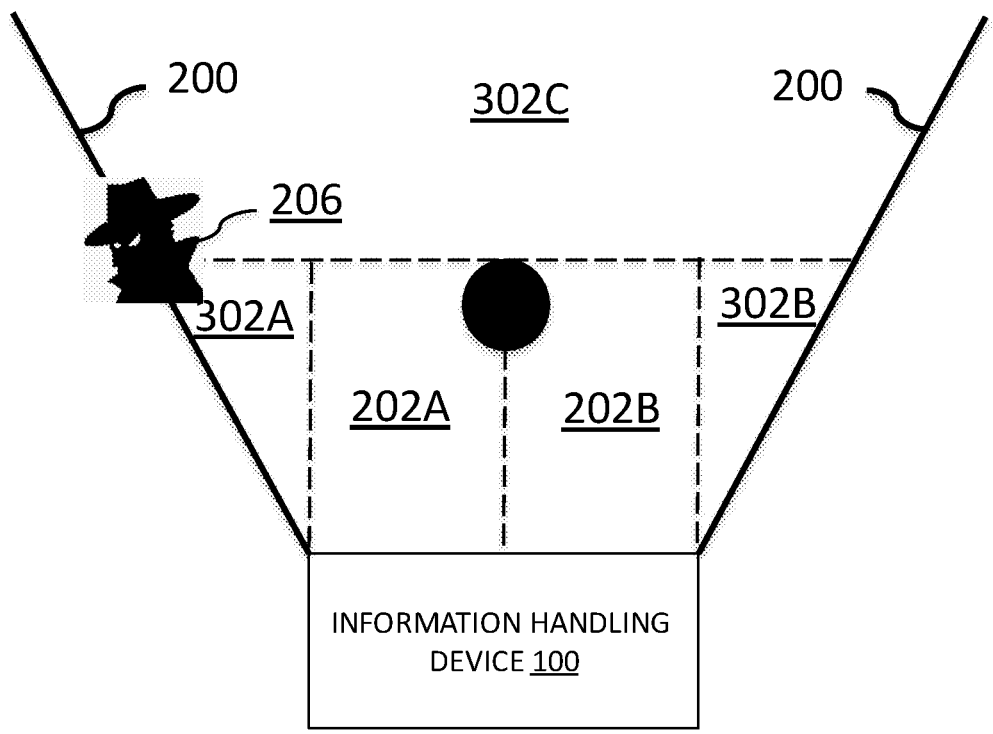
Figure 4E:
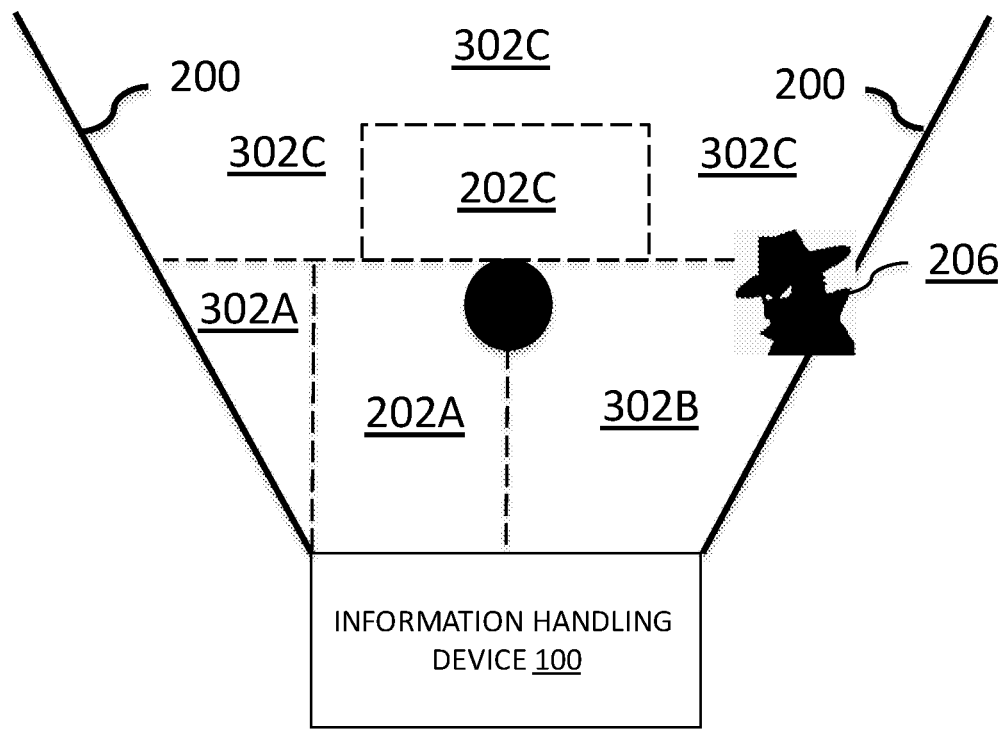
Figure 4F:
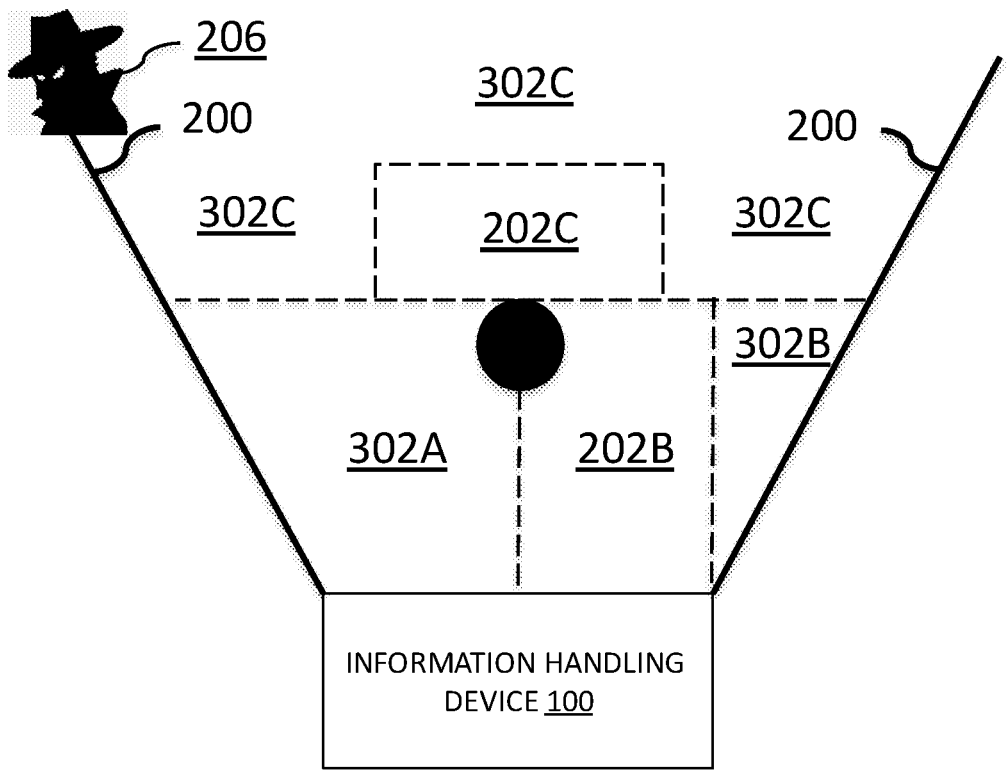
Figure 4G:
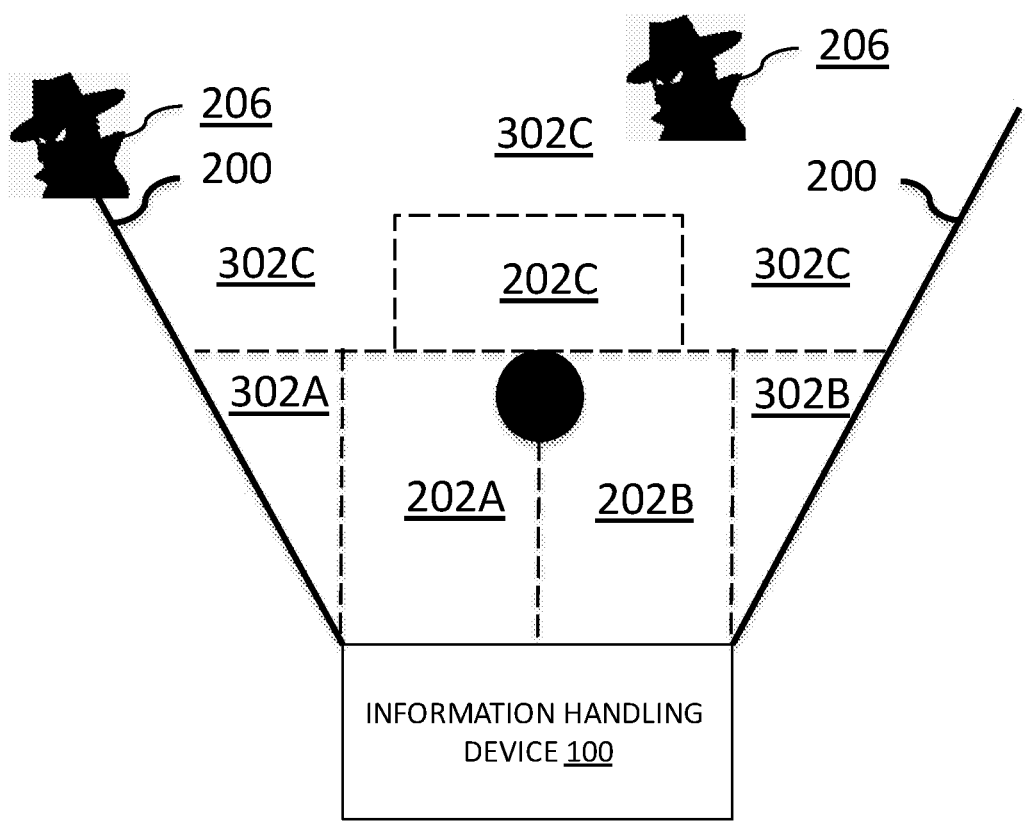

FIG. 3D illustrates one embodiment of the field of view 200 of a camera 102 including unauthorized zones 302A and 302B similar to the various embodiments discussed elsewhere herein. FIG. 3E illustrates another embodiment of the field of view 200 of a camera 102 including unauthorized zones 302A and 302C similar to the various embodiments discussed elsewhere herein. FIG. 3F illustrates yet another embodiment of the field of view 200 of a camera 102 including unauthorized zones 302B and 302C similar to the various embodiments discussed elsewhere herein. FIG. 3G illustrates still another embodiment of the field of view 200 of a camera 102 including unauthorized zones 302A, 302B, and 302C similar to the various embodiments discussed elsewhere herein.

In various embodiments, authorized zones 202A through 202C include the same or substantially the same width as unauthorized zones 302A through 302C from the perspective of a camera 102. Here, the difference between authorized zones 202A through 202C and unauthorized zones 302A through 302C is the depth dimension.

With reference to FIGS. 4A through 4G, one or more of authorized zones 202A through 202C include a different width than one or more of unauthorized zones 302A through 302C from the perspective of a camera 102. AS illustrated in FIGS. 4A through 4G, the width of one or more of authorized zones 202A through 202C may overlap with one or more of unauthorized zones 302A through 302C from the perspective of a camera 102 and will further include different depth dimensions (e.g., distance from the camera 102 and/or behind an authorized user 204).

In various embodiments, a camera 102 is configured to detect one or more individuals 206 in one or more of authorized zones 202A, 202B, and 202C. That is, the camera 102 can detect whether the individual(s) 206 is/are within authorized zone 202A, 202B, or 202C and/or whether the individual 206 is simultaneously within two of the authorized zones 202A, 202B, and 202C (e.g., authorized zones 202A and 202C or authorized zones 202B and 202C), as variously illustrated in FIGS. 4A through 4G.

In additional or alternative embodiments, a camera 102 is configured to detect multiple individuals 206 in one or more of unauthorized zones 302A, 302B, and 302C. That is, the camera 102 can detect whether the individuals 206 are within unauthorized zone 302A, 302B, and/or 302C and/or whether one or more individuals 206 is/are simultaneously within two of the unauthorized zones 302A, 302B, and 302C (e.g., unauthorized zones 302A and 302C or unauthorized zones 302B and 302C).

In various embodiments, a camera 102 can detect whether the individual(s) 206 is/are within the unauthorized zone(s) 302A, 302B, and/or 302C based on detecting the full face of the individual(s) 206 and/or a partial face of the individual(s) 206 (e.g., less than the full face of the individual(s) 206). In some embodiments, detecting the partial face of the individual(s) 206 includes detecting one or both eyes of each respective individual 206.

A microphone 104 may include any suitable hardware and/or software that is known or developed in the future that can detect sound or noise. In various embodiments, a microphone 104 includes hardware and/or software that can detect the voice of one or more individuals 206 in an environment that is adjacent to and/or surrounding the information handling device 100.

A display 106 may include any suitable hardware and/or software that can display digital information (e.g., contents) thereon and functionality to operate in privacy mode. In some embodiments, the display 106 operates in privacy mode in response to a privacy module 108 (e.g., see FIG. 5) determining and/or detecting the occurrence of one or more triggers and/or trigger events, as discussed elsewhere herein.

In various embodiments, the privacy mode includes the display 106 displaying its contents in a manner that is visible when viewed at an angle that is perpendicular to and/or substantially perpendicular to a plane of a screen of the display 106 and not visible when viewed at an angle that is not perpendicular to and/or not substantially perpendicular to the horizontal viewing plane of a screen of the display 106. In additional or alternative embodiments, the privacy mode includes the display 106 dimming the brightness of the contents displayed on the display 106 and/or displaying the contents with a brightness that is below a predetermined level of brightness.

In further additional or alternative embodiments, the privacy mode includes displaying thereon a warning and/or notification that one or more individuals are present within one or more unauthorized zones 302A, 302B, and/or 302C. In still further additional or alternative embodiments, the privacy mode includes displaying thereon a warning and/or notification that one or more unauthorized individuals 206 are present within the environment adjacent to and/or surrounding the information handling device 100.

Figure 5:
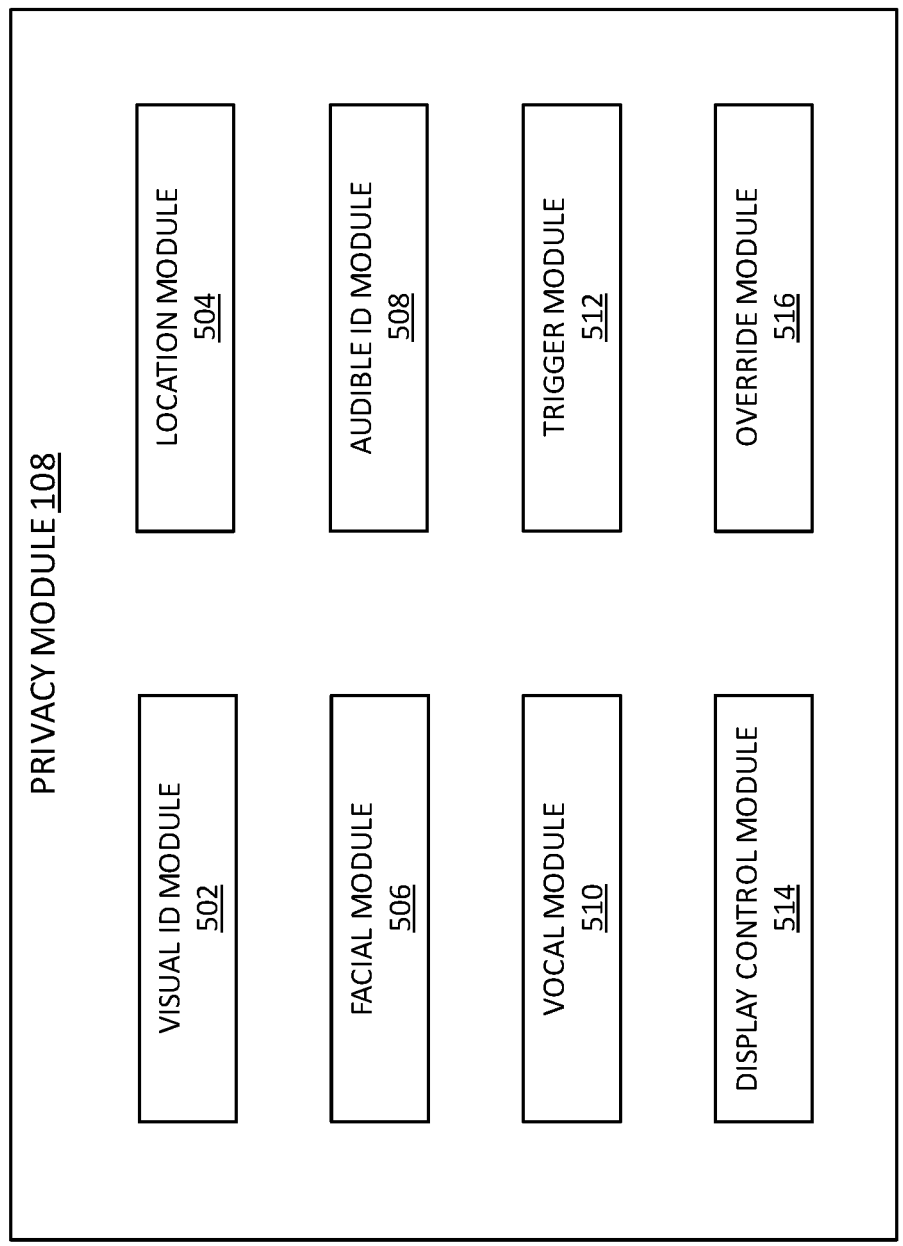
FIG. 5 is a schematic block diagram illustrating one embodiment of a privacy module included in the information handling device of FIG. 1.

With reference to FIG. 5, FIG. 5 is a schematic block diagram illustrating one embodiment of a privacy module 108 included in an information handling device 100. At least in the illustrated embodiment, the privacy module 108 includes, among other components, one or more of a visual identification (ID) module 502, a location module 504, a facial module 506, an audible identification (ID) module 508, a vocal module 510, a trigger event module 512, a display control module 514, and an override module 516.

A visual ID module 502 can include any suitable hardware and/or software that can determine whether one or more individuals 206 is/are present in the field of view of the camera 102. In some embodiments, the determination is based on one or more characteristics of one or more elements within in the field of view 200 being associated with that of one or more persons or individuals 206.

A location module 504 can include any suitable hardware and/or software that can determine the location(s) of the individual(s) 206 within the field of view 200 of the camera 102. In some embodiments, the location module 504 can determine whether the individual(s) 206 is/are present within the unauthorized zones 302A, 302B, and/or 302C in response to determining that one or more individuals 206 is/are present within its field of view 200. In additional or alternative embodiments, the location module 504 can determine whether the individual(s) 206 is/are present within the authorized zones 202A, 202B, and/or 202C in response to code determining that one or more individuals 206 is/are present within the field of view of the camera 102.

A facial module 506 can include any suitable hardware and/or software that can store a set of faces and/or a set of partial faces of one or more persons. Each stored face and/or partial face (e.g., one or more eyes, etc.) can be categorized and/or classified as the face and/or partial face of an individual 206 that is authorized or unauthorized to view the content on display 106, as discussed elsewhere herein. The stored face(s) and/or partial face(s) can be input by an authorized user and/or learned (e.g., via one or more machine learning algorithms and/or techniques) by the privacy module 108, as discussed elsewhere herein.

In various embodiments, the facial module 506 can categorize and/or classify the face and/or partial face of authorized persons based on whether each respective person has previously been detected as having been present in an authorized zone 202A, 202B, and/or 202C. That is, the facial module 506 can learn (e.g., via one or more machine learning algorithms and/or techniques) the face and/or partial face of each person that has been previously detected in one or more of the authorized zones 202A, 202B, and/or 202C (along with an authorized user) and classify/categorize each face and/or partial face as that of one belonging to an authorized person.

In other embodiments, the facial module 506 can categorize and/or classify the face and/or partial face of unauthorized persons based on whether each respective person has previously been detected as having been present in an unauthorized zone 302A, 302B, and/or 302C. That is, the facial module 506 can learn (e.g., via one or more machine learning algorithms and/or techniques) the face and/or partial face of each person that has been previously detected in one or more of the unauthorized zones 302A, 302B, and/or 302C and classify/categorize each face and/or partial face as that of one belonging to an unauthorized person.

In yet further additional or alternative embodiments, the facial module 506 can utilize one or more facial recognition algorithms and/or techniques to identify whether the face and/or partial face of an individual 206 detected by the camera 102 is that of an authorized or unauthorized individual 206. In various embodiments, the code can determine whether the face and/or partial face of an individual 206 detected by the camera 102 belongs to an authorized or unauthorized person by comparing the detected face and/or partial face to the faces and/or partial faces of authorized and/or unauthorized persons stored in the facial module 506. In some embodiments, the facial module 506 can determine that a detected individual 206 is an authorized person in response the face and/or partial face of the individual 206 matching the face and/or partial face of an authorized person stored in the facial module 506. Further, the facial module 506 can determine that a detected individual 206 is an unauthorized person in response the face and/or partial face of the individual 206 not matching the face and/or partial face of an authorized person stored in the facial module 506. Moreover, the facial module 506 can determine that a detected individual 206 is an unauthorized person in response the face and/or partial face of the individual 206 matching the face and/or partial face of an unauthorized person stored in the facial module 506.

In some embodiments, the facial module 506 can utilize one or more facial recognition algorithms and/or techniques to learn (e.g., via one or more machine learning algorithms and/or techniques) and/or associate the partial face of an authorized and/or unauthorized person with the full face of the corresponding authorized and/or unauthorized person. That is, the facial module 506 is capable of associating a partial face of a person with the full face of the person.

For example, the facial module 506 can identify, associate, and/or match a detected individual 206 that is wearing a mask, mouth covering, and/or eye covering (e.g., a partial face) with the full face and/or a different partial face of a corresponding authorized or unauthorized person stored in the facial module 506. As such, the identification, association, and/or matching can be utilized to identify whether the detected individual 206 in an authorized or unauthorized person.

An audible ID module 508 can include any suitable hardware and/or software that can differentiate sounds and/or noises detected by a microphone 104. In some embodiments, the audible ID module 508 can determine that one or more sounds and/or noises detected by the microphone 104 includes the voice of one or more persons in the environment adjacent to and/or surrounding the information handling device 100.

A vocal module 510 can include any suitable hardware and/or software that can store the voice of one or more persons. Each stored voice can be categorized and/or classified as the voice of an authorized or unauthorized individual 206, as discussed elsewhere herein. The stored voice (s) can be input by an authorized user and/or learned (e.g., via one or more machine learning algorithms and/or techniques) by the vocal module 510, as discussed elsewhere herein.

In various embodiments, the vocal module 510 can categorize and/or classify the voice of authorized persons based on whether each respective person has previously been detected as having been present in an authorized zone 202A, 202B, and/or 202C. That is, the vocal module 510 can learn (e.g., via one or more machine learning algorithms and/or techniques) the voice of each person that has been previously detected in one or more of the authorized zones 202A, 202B, and/or 202C (along with an authorized user) and classify/categorize each voice as that of one belonging to an authorized person.

In other embodiments, the vocal module 510 can categorize and/or classify the voice of unauthorized persons based on whether each respective person has previously been detected as having been present in an unauthorized zone 302A, 302B, and/or 302C. That is, the vocal module 510 can learn (e.g., via one or more machine learning algorithms and/or techniques) the voice of each person that has been previously detected in one or more of the unauthorized zones 302A, 302B, and/or 302C and classify/categorize each voice as that of one belonging to an unauthorized person.

In yet further additional or alternative embodiments, the vocal module 510 can utilize one or more voice recognition algorithms and/or techniques to identify whether the voice of an individual 206 detected by the microphone 104 is that of an authorized or unauthorized individual 206. In various embodiments, the vocal module 510 can determine whether the voice of an individual 206 detected by the microphone 104 belongs to an authorized or unauthorized person by comparing the detected voice to the voices of authorized and/or unauthorized persons stored in the vocal module 510.

In some embodiments, the vocal module 510 can determine that a detected individual 206 is an authorized person in response the voice of the individual 206 matching the voice of an authorized person stored in the vocal module 510. Further, the vocal module 510 can determine that a detected individual 206 is an unauthorized person in response the voice of the individual 206 not matching the voice of an authorized person stored in the vocal module 510. Moreover, the vocal module 510 can determine that a detected individual 206 is an unauthorized person in response the voice of the individual 206 matching the voice of an unauthorized person stored in the vocal module 510.

A trigger event module 512 can include any suitable hardware and/or software that can detect and/or determine the occurrence of a trigger and/or trigger event. In some embodiments, the trigger event module 512 can determine/detect the occurrence of a trigger event in response to the location module 504 determining that one or more individuals 206 is/are present in one or more unauthorized zones 302A, 302B, and/or 302C. In additional or alternative embodiments, the trigger event module 512 can determine/detect the occurrence of a trigger event in response to the facial module 506 determining that one or more detected faces and/or partial faces belong(s) to an unauthorized person. In further additional or alternative embodiments, the trigger event module 512 can determine/detect the occurrence of a trigger event in response to the vocal module 510 determining that one or more detected voices belong(s) to an unauthorized person.

A display control module 514 can include any suitable hardware and/or software that can operate a display 106 in privacy mode. In some embodiments, the display control module 514 is configured to operate the display 106 in privacy mode in response to the trigger event module 510 determining/detecting the occurrence of a trigger event.

The privacy mode includes the display control module 514 operating the display 106 to display its contents in a manner that is visible when viewed at an angle that is perpendicular to and/or substantially perpendicular to a plane of a screen of the display 106 and not visible when viewed at an angle that is not perpendicular to and/or not substantially perpendicular to the horizontal viewing plane of a screen of the display 106. In additional or alternative embodiments, the privacy mode includes the display control module 514 dimming the brightness of the contents displayed on the display 106 and/or displaying the contents with a brightness that is below a predetermined level of brightness.

In further additional or alternative embodiments, the privacy mode includes the display control module 514 operating the display 106 to display thereon a warning and/or notification that one or more individuals are present within one or more unauthorized zones 302A, 302B, and/or 302C. In still further additional or alternative embodiments, the privacy mode includes the display control module 514 operating the display 106 to display thereon a warning and/or notification that one or more unauthorized individuals 206 are present within the environment adjacent to and/or surrounding the information handling device 100.

An override module 516 can include any suitable hardware and/or software that can override operating the display 106 in privacy mode such that the display operates in a normal and/or non-privacy mode.

In various embodiments, the override module 516 can override the display 106 operating in privacy mode when an individual 206 is detected within one or more unauthorized zones 302A, 302B, and 302C. In some embodiments, the override module 516 can override the privacy mode in response to the facial module 506 determining that the face (e.g., full face) and/or partial face of the individual 206 detected within the one or more unauthorized zones 302A, 302B, and 302C matches the face and/or partial face of an authorized person stored in the facial module 506.

In additional or alternative embodiments, the override module 516 can override a display 106 operating in privacy mode in response to the vocal module 510 determining that the detected voice of an individual 206 present within the one or more unauthorized zones 302A, 302B, and 302C matches the voice of an authorized person stored in the vocal module 510.

Overriding the privacy mode, in some embodiments, includes the display 106 displaying its contents in a normal mode (e.g., non-privacy mode). In additional or alternative embodiments, overriding the privacy mode includes the display 106 displaying its contents with a full range of viewing angles (e.g., not having to be viewed at an angle that is perpendicular or substantially perpendicular to the viewing plane of the screen). In further additional or alternative embodiments, overriding the privacy mode includes the display 106 displaying its contents with a standard level of brightness (e.g., without a dimmed brightness, without a reduced level of brightness, and/or with a brightness that is greater than a predetermined threshold level of brightness).

Figure 6:
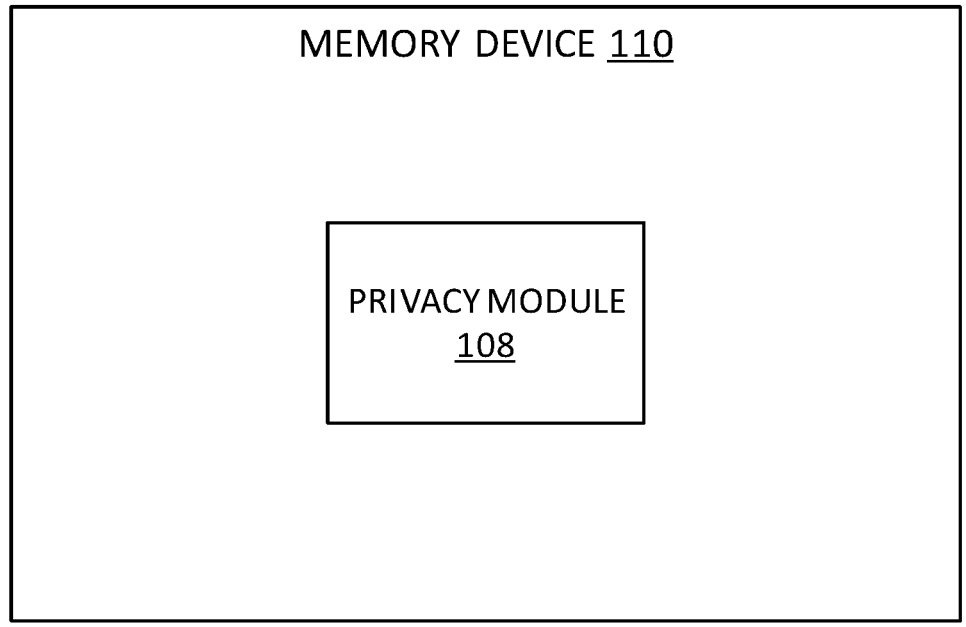
FIG. 6 is a schematic block diagram illustrating one embodiment of a memory device included in the information handling device of FIG. 1.

Referring to FIG. 6, FIG. 6 is a schematic block diagram illustrating one embodiment of at least one memory device 110 included in the set of memory devices 110 in the information handling device 100. The memory device 110 may include any suitable type of device and/or system that is known or developed in the future that can store computer-useable and/or computer-readable code. In various embodiments, a memory device 110 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

In various embodiments, a memory device 110 includes volatile computer storage media. For example, a memory device 110 may include random access memory (RAM), including dynamic RAM (DRAM), synchronous dynamic RAM (SDRAM), and/or static RAM (SRAM). In some embodiments, a memory device 110 includes non-volatile computer storage media. For example, a memory device 110 may include a hard disk drive, a flash memory, and/or any other suitable non-volatile computer storage device that is known or developed in the future. In some embodiments, a memory device 110 includes both volatile and non-volatile computer storage media. In some embodiments, a memory device 110 also stores program code and/or related data, such as an operating system (OS) and/or other controller algorithms operating on an information handling device 100.

At least in the illustrated embodiment, the memory device 110 stores, among other data, a privacy module 108 that is similar to the privacy module 108 discussed elsewhere herein. The privacy module 108 stored in the memory device 110 can be in addition to the privacy module 108 in the information handling device 100 (e.g., a copy of the privacy module 108) or in lieu of the privacy module 108 in the information handling device 100.

Figure 7:
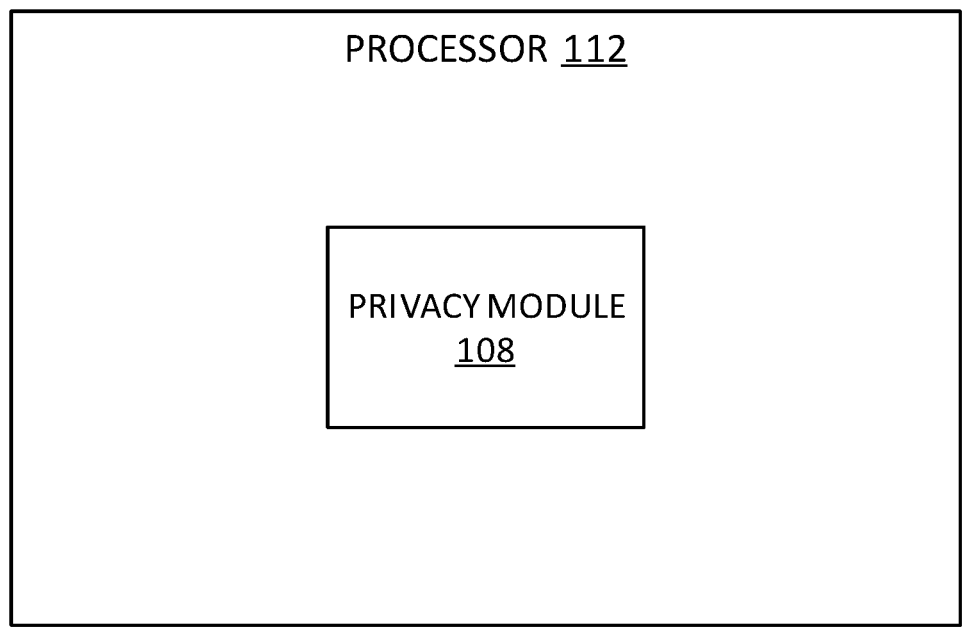
FIG. 7 is a schematic block diagram illustrating one embodiment of a processor included in the information handling device of FIG. 1.

With reference to FIG. 7, FIG. 7 is a schematic block diagram illustrating one embodiment of a processor 112 included in the information handling device 100. The processor 112 may include any suitable hardware and/or software that is known or developed in the future capable of operating a display 106 in privacy mode.

At least in the illustrated embodiment, the processor 112 includes, among other components, a privacy module 108 that is similar to the privacy module 108 discussed elsewhere herein. The privacy module 108 included in the processor 112 can be in addition to the privacy module 108 in the information handling device 100 and/or the memory device(s) 110 (e.g., a copy of the privacy module(s) 108) or in lieu of the privacy module(s) 108 in the information handling device 100 and the memory device(s) 110.

In various embodiments, the processor 112 includes and/or forms at least a portion of a controller capable of executing computer-readable instructions and/or capable of performing logical operations. For example, the processor 112 may be a microcontroller, a microprocessor, a central processing unit (CPU), a graphics processing unit (GPU), an auxiliary processing unit, and/or a field programmable gate array (FPGA), etc., among other programmable controllers that are possible and contemplated herein. In some embodiments, the processor 112 includes firmware, hardware, and/or software that executes instructions in the code stored in the memory device(s) 110, information handling device 100, and/or processor 112 to perform the functions, operations, methods, and/or routines of the privacy module(s) 108 included therein.

Figure 8:
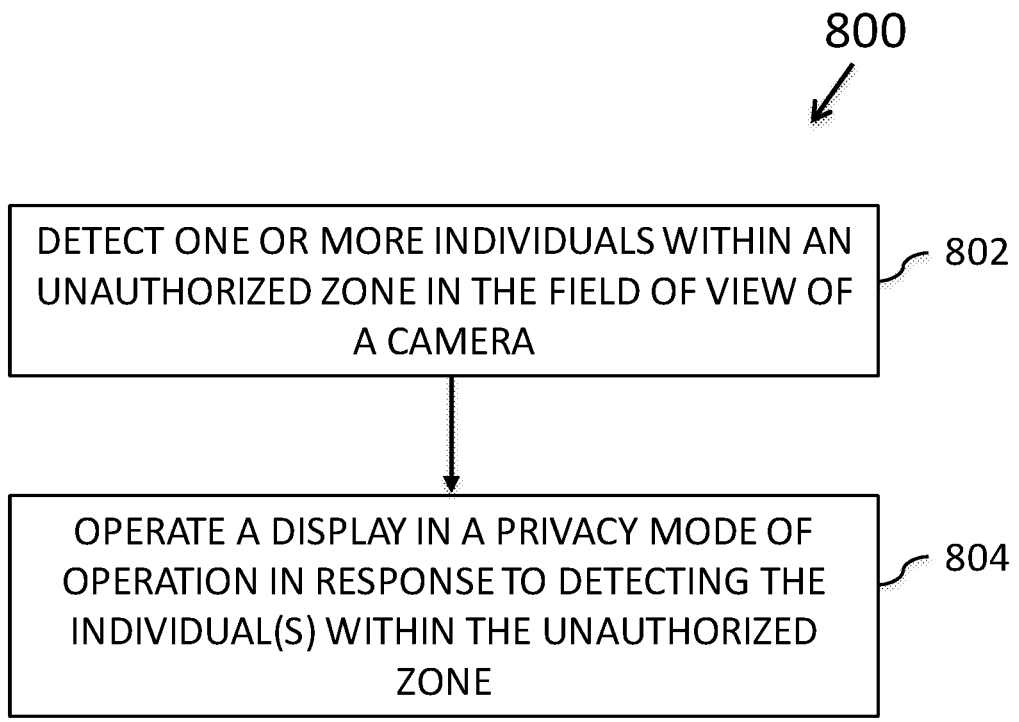
FIG. 8 is a schematic flow chart diagram illustrating one embodiment of a method for operating a display in privacy mode.

FIG. 8 is a schematic flow chart diagram illustrating one embodiment of a method 800 for operating a display 106 in privacy mode. In some embodiments, the method 800 is performed by an apparatus, such as an information handling device 100. In other embodiments, the method 800 may be performed by one or more modules, such as the privacy module(s) 108 and/or one or more modules included therein. In certain embodiments, the method 800 may be performed by a processor 112 (e.g., a microcontroller, a microprocessor, a CPU, a GPU, an auxiliary processing unit, and/or a FPGA, etc., among other processing devices and/or systems that are possible and contemplated herein) executing computer-readable and/or computer-useable program code.

In various embodiments, the method 800 begins by a camera 102 detecting one or more individuals 206 within one or more unauthorized zones (e.g., unauthorized zone(s) 302A, 302B, and/or 302C) in a field of view 200 of the camera 102 (block 802). In various embodiments, determining that the individual(s) is/are within the unauthorized zone(s) 302A, 302B, and/or 302C is performed by a location module 505 included in a privacy module 108.

The method 800 further includes operating a display 106 in privacy mode in response to the camera 102 detecting the individual(s) 206 being present within the unauthorized zone(s) 302A, 302B, and/or 302C (block 804). The privacy mode can include one or more of the various privacy modes discussed elsewhere herein. In various embodiments, a display control module 514 operates the display 106 in the privacy mode.

Figure 9:
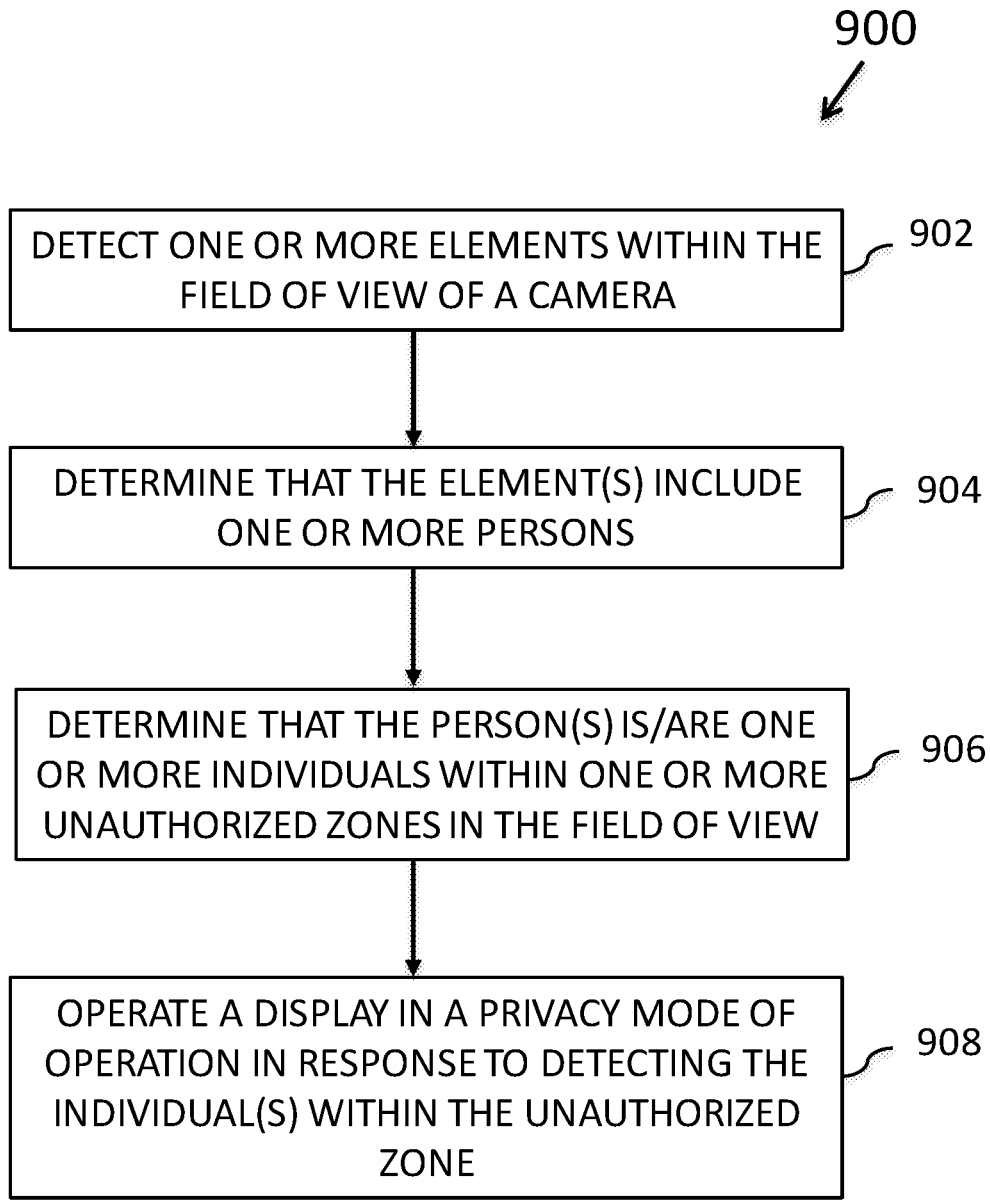
FIG. 9 is a schematic flow chart diagram illustrating another embodiment of a method for operating a display in privacy mode.

FIG. 9 is a schematic flow chart diagram illustrating another embodiment of a method 900 for operating a display 106 in privacy mode. In some embodiments, the method 900 is performed by an apparatus, such as an information handling device 100. In other embodiments, the method 900 may be performed by one or more modules, such as the privacy module(s) 108 and/or one or more modules included therein. In certain embodiments, the method 900 may be performed by a processor 112 (e.g., a microcontroller, a microprocessor, a CPU, a GPU, an auxiliary processing unit, and/or a FPGA, etc., among other processing devices and/or systems that are possible and contemplated herein) executing computer-readable and/or computer-useable program code.

In various embodiments, the method 900 begins by a camera 102 detecting one or more elements within the field of view 200 of the camera 102 (block 902). The method 900 further includes determining that the detected element(s) includes one or more persons (block 904). In various embodiments, determining that the detected element(s) includes one or more persons is performed by a visual ID module 502 included in a privacy module 108.

In addition, the method 900 includes determining that the person(s) is/are one or more individuals 206 within one or more unauthorized zones (e.g., unauthorized zone 302A, 302B, and/or 302C) in the field of view 200 of the camera 102 (block 906). In various embodiments, determining that the person(s) is/are one or more individuals 206 within the unauthorized zone(s) 302A, 302B, and/or 302C) is performed by a location module 504 included in a privacy module 108.

The method 900 further includes operating a display 106 in privacy mode in response to determining that the individual(s) 206 is/are present within the unauthorized zone(s) 302A, 302B, and/or 302C (block 908). The privacy mode can include one or more of the various privacy modes discussed elsewhere herein. In various embodiments, a display control module 514 operates the display 106 in the privacy mode.

Figure 10:
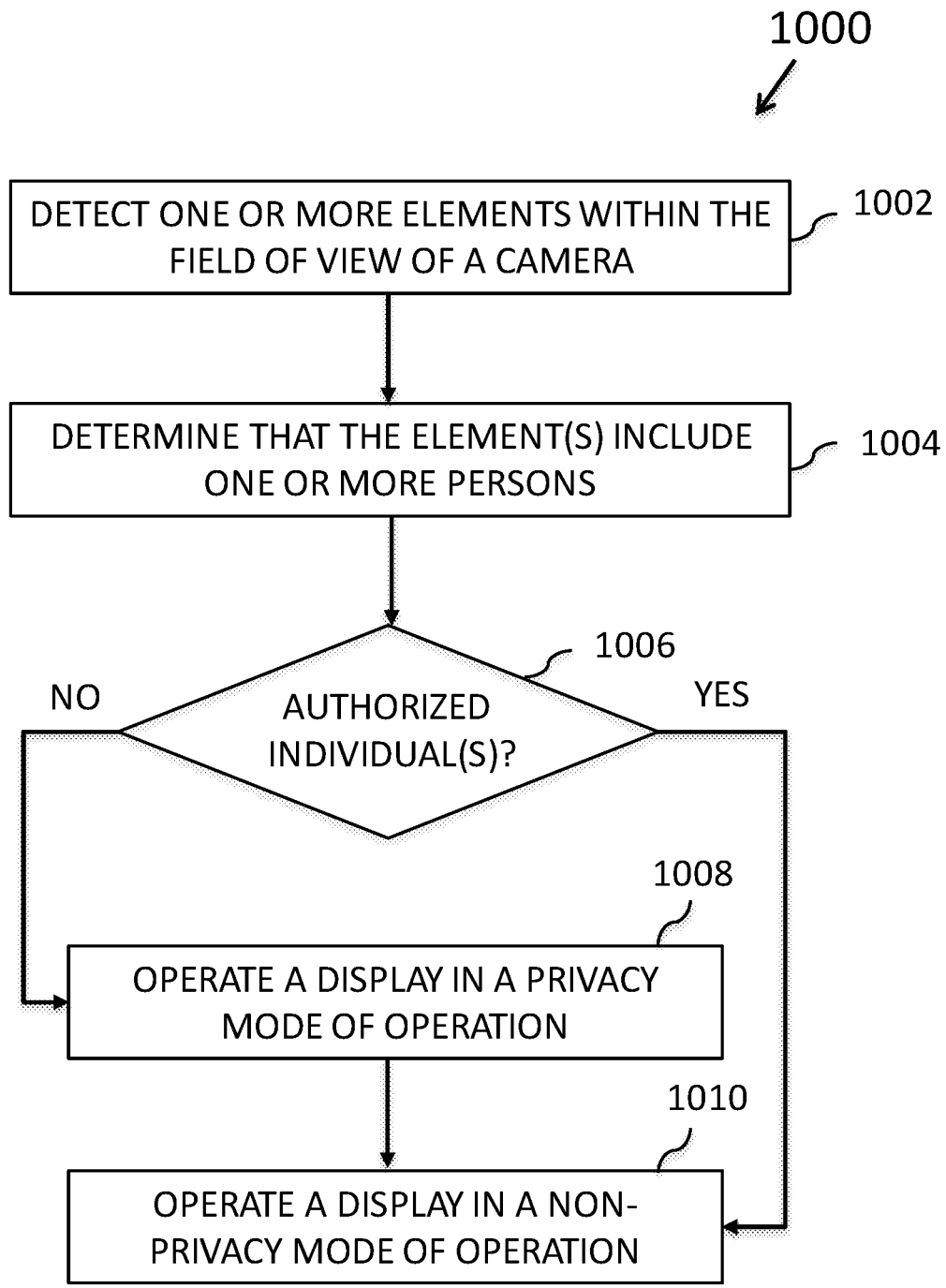
FIG. 10 is a schematic flow chart diagram illustrating one embodiment of a method for operating a display.

FIG. 10 is a schematic flow chart diagram illustrating one embodiment of a method 1000 for operating a display 106. In some embodiments, the method 1000 is performed by an apparatus, such as an information handling device 100. In other embodiments, the method 1000 may be performed by one or more modules, such as the privacy module(s) 108 and/or one or more modules included therein. In certain embodiments, the method 1000 may be performed by a processor 112 (e.g., a microcontroller, a microprocessor, a CPU, a GPU, an auxiliary processing unit, and/or a FPGA, etc., among other processing devices and/or systems that are possible and contemplated herein) executing computer-readable and/or computer-useable program code.

In various embodiments, the method 1000 begins by a camera 102 detecting one or more elements within the field of view 200 of the camera 102 (block 1002). The method 1000 further includes determining that the detected element(s) includes one or more persons (block 1004). In various embodiments, determining that the detected element(s) includes one or more persons is performed by a visual ID module 502 included in a privacy module 108.

The method 1000 further includes determining whether the individual(s) 206 is/are an authorized individual 206 (block 1006). In response to determining that the individual(s) 206 is/are an unauthorized individual 206 (e.g., a "NO" in block 1006), the method 1000 includes operating a display 106 in privacy mode (block 1008). The privacy mode can include one or more of the various privacy modes discussed elsewhere herein. In various embodiments, a display control module 514 operates the display 106 in the privacy mode.

In response to determining that the individual(s) 206 is/are an authorized individual 206 (e.g., a "YES" in block 1006), the method 1000 includes operating the display 106 in a normal and/or non-privacy mode (block 1010). The normal and/or non-privacy mode can include one or more of the various normal modes of operation and/or non-privacy modes of operation discussed elsewhere herein. In various embodiments, a display control module 514 operates the display 106 in the normal and/or non-privacy mode.

An authorized or unauthorized individual 206 can be determined utilizing one or more facial recognition algorithms/techniques and/or facial comparison/matching techniques discussed elsewhere herein. Further, the one or more facial recognition algorithms/techniques and/or facial comparison/matching techniques can utilize the full face and/or partial face (e.g., one or more eyes) of the individual(s) 206. In various embodiments, determining whether the individual(s) 206 is/are an authorized individual 206 can be performed by a facial module 506 included in a privacy module 108.

Figure 11:
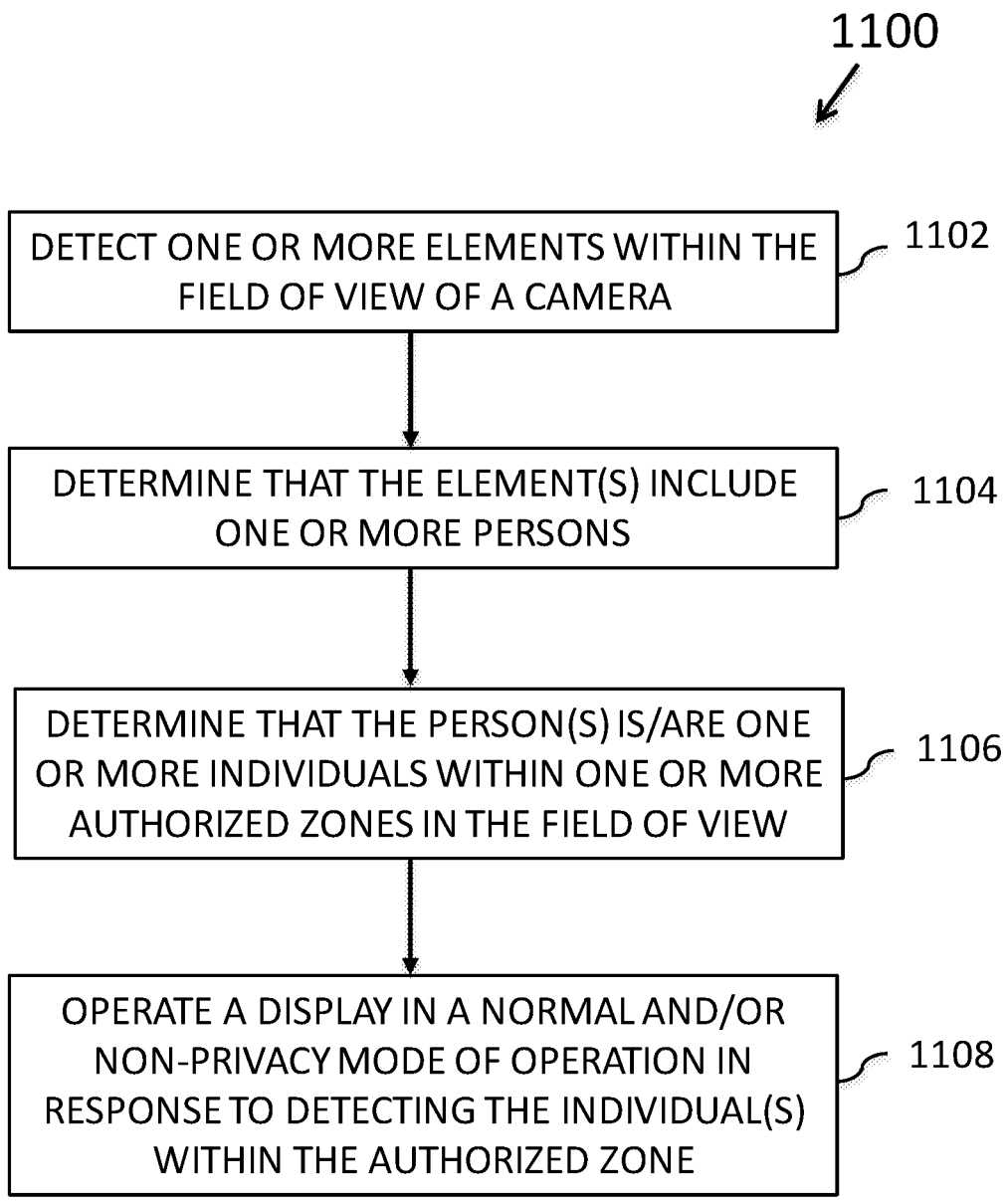
FIG. 11 is a schematic flow chart diagram illustrating one embodiment of a method for operating a display in non-privacy mode.

FIG. 11 is a schematic flow chart diagram illustrating another embodiment of a method 1100 for operating a display 106 in a non-privacy mode. In some embodiments, the method 1100 is performed by an apparatus, such as an information handling device 100. In other embodiments, the method 1100 may be performed by one or more modules, such as the privacy module(s) 108 and/or one or more modules included therein. In certain embodiments, the method 1100 may be performed by a processor 112 (e.g., a microcontroller, a microprocessor, a CPU, a GPU, an auxiliary processing unit, and/or a FPGA, etc., among other processing devices and/or systems that are possible and contemplated herein) executing computer-readable and/or computer-useable program code.

In various embodiments, the method 1100 begins by a camera 102 detecting one or more elements within the field of view 200 of the camera 102 (block 1102). The method 1100 further includes determining that the detected element(s) includes one or more persons (block 1104). In various embodiments, determining that the detected element(s) includes one or more persons is performed by a visual ID module 502 included in a privacy module 108.

In addition, the method 1100 includes determining that the person(s) is/are one or more individuals 206 within one or more authorized zones (e.g., authorized zone 202A, 202B, and/or 202C) in the field of view 200 of the camera 102 (block 1106). In various embodiments, determining that the person(s) is/are one or more individuals 206 within the authorized zone(s) 202A, 202B, and/or 202C) is performed by a location module 504 included in a privacy module 108.

The method 1100 further includes operating a display 106 in a normal and/or non-privacy mode in response to determining that the individual(s) 206 is/are present within the authorized zone(s) 202A, 202B, and/or 202C (block 1108). The normal and/or non-privacy mode can include one or more of the various normal modes of operation and/or non-privacy modes of operation discussed elsewhere herein. In various embodiments, a display control module 514 operates the display 106 in the normal and/or non-privacy mode.

Figure 12:
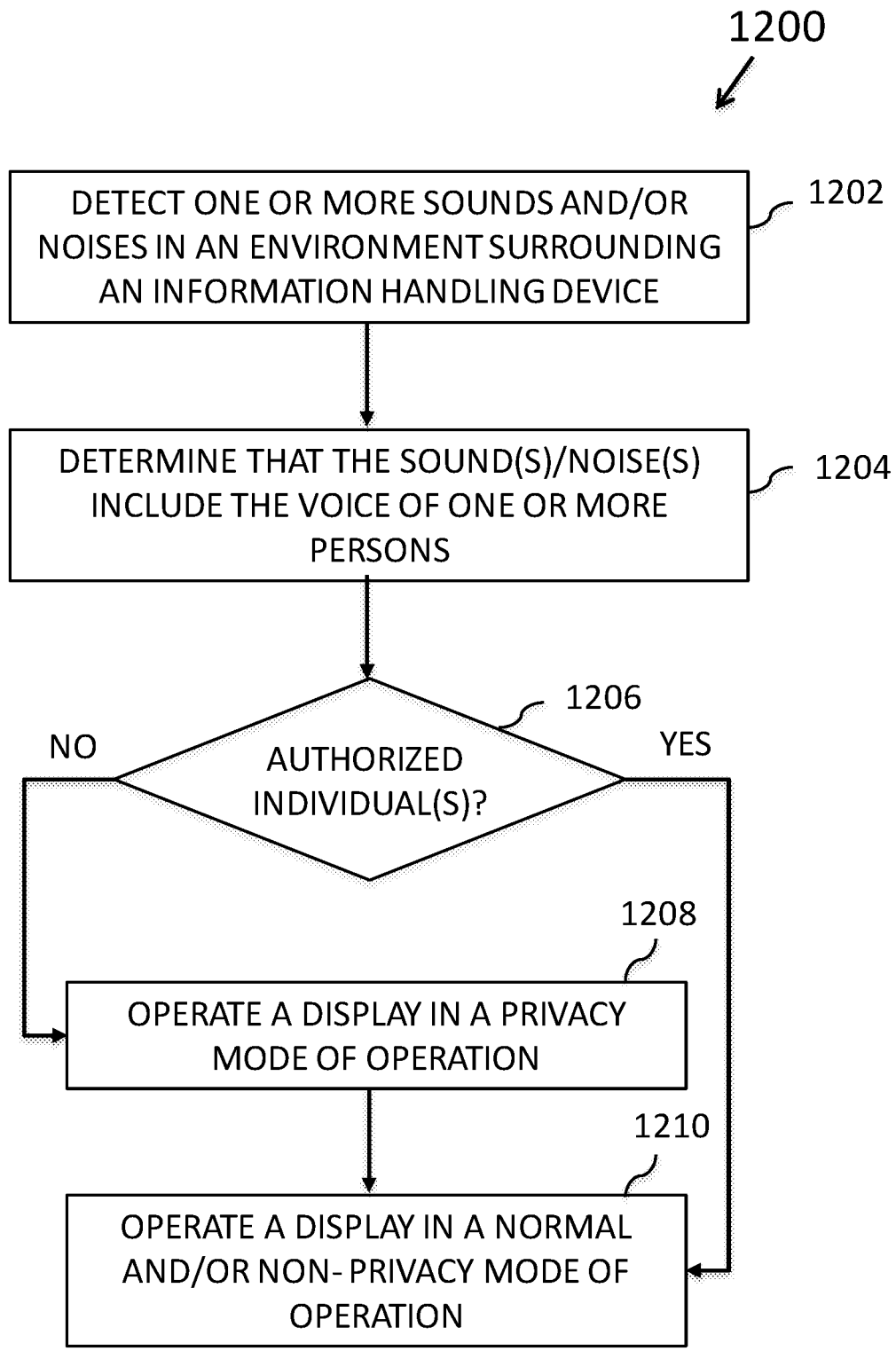
FIG. 12 is a schematic flow chart diagram illustrating another embodiment of a method for operating a display.

FIG. 12 is a schematic flow chart diagram illustrating another embodiment of a method 1200 for operating a display 106. In some embodiments, the method 1200 is performed by an apparatus, such as an information handling device 100. In other embodiments, the method 1200 may be performed by one or more modules, such as the privacy module(s) 108 and/or one or more modules included therein. In certain embodiments, the method 1200 may be performed by a processor 112 (e.g., a microcontroller, a microprocessor, a CPU, a GPU, an auxiliary processing unit, and/or a FPGA, etc., among other processing devices and/or systems that are possible and contemplated herein) executing computer-readable and/or computer-useable program code.

In various embodiments, the method 1200 begins by a microphone 104 detecting one or more sounds and/or noises in an environment surrounding an information handling device 100 (block 1002). The method 1200 further includes determining that the detected sound(s) and/or noise(s) includes the voice one or more persons (block 1204). In various embodiments, determining that the detected sound(s) and/or noise(s) includes the voice of one or more persons is performed by an audible ID module 508 included in a privacy module 108.

The method 1200 further includes determining whether the individual(s) 206 is/are an authorized individual 206 (block 1206). In response to determining that the individual(s) 206 is/are an unauthorized individual 206 (e.g., a "NO" in block 1206), the method 1200 includes operating a display 106 in privacy mode (block 1208). The privacy mode can include one or more of the various privacy modes discussed elsewhere herein. In various embodiments, a display control module 514 operates the display 106 in the privacy mode.

In response to determining that the individual(s) 206 is/are an authorized individual 206 (e.g., a "YES" in block 1206), the method 1200 includes operating the display 106 in a normal and/or non-privacy mode (block 1210). The normal and/or non-privacy mode can include one or more of the various normal modes of operation and/or non-privacy modes of operation discussed elsewhere herein. In various embodiments, a display control module 514 operates the display 106 in the normal and/or non-privacy mode.

An authorized or unauthorized individual 206 can be determined utilizing one or more vocal recognition algorithms/techniques and/or one or more of the vocal comparison/matching techniques discussed elsewhere herein. In various embodiments, determining whether the individual(s) 206 is/are an authorized individual 206 can be performed by a vocal module 510.

Figure 13:
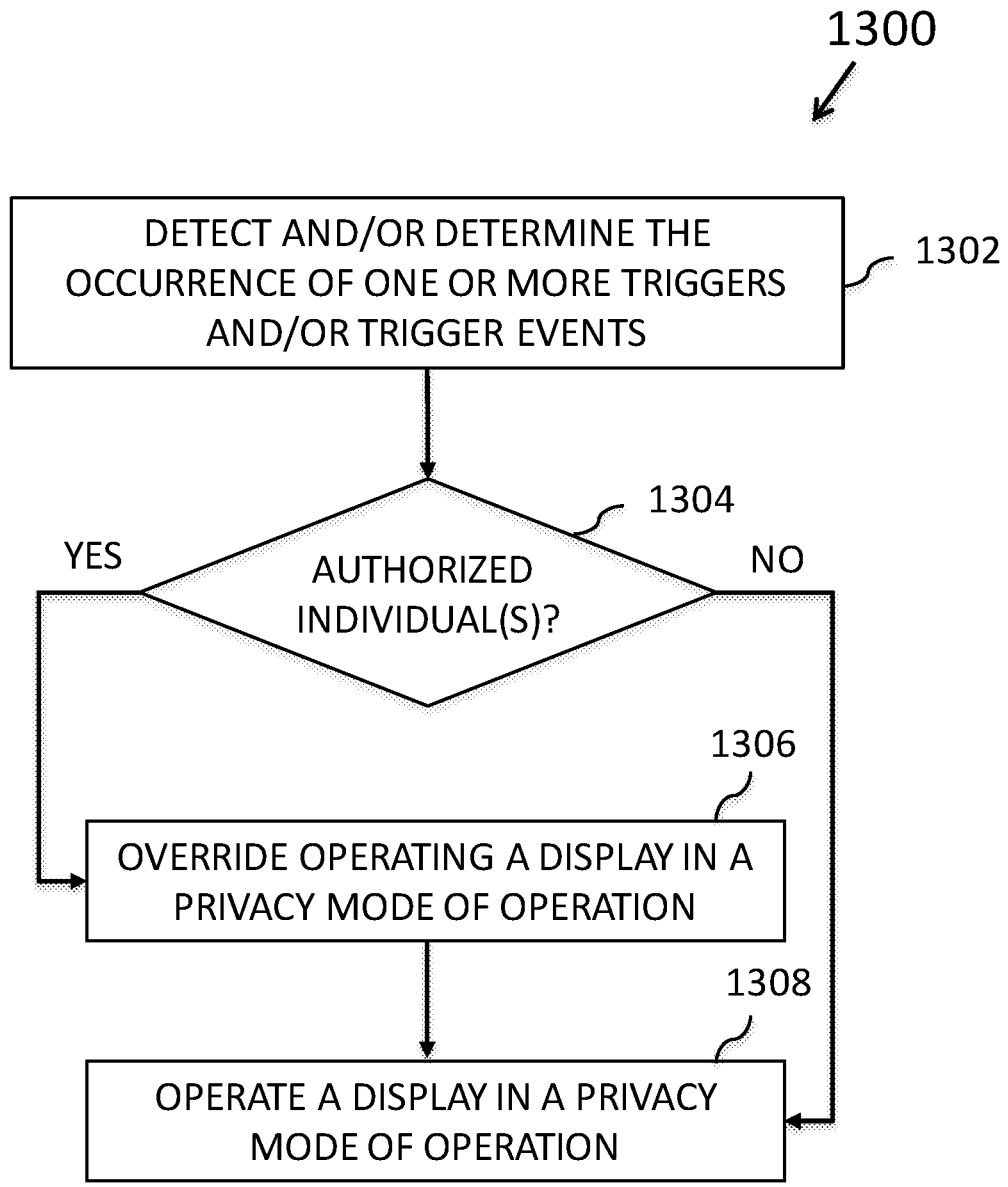
FIG. 13 is a schematic flow chart diagram illustrating yet another embodiment of a method for operating a display.

FIG. 13 is a schematic flow chart diagram illustrating another embodiment of a method 1300 for operating a display 106. In some embodiments, the method 1300 is performed by an apparatus, such as an information handling device 100. In other embodiments, the method 1300 may be performed by one or more modules, such as the privacy module(s) 108 and/or one or more modules included therein. In certain embodiments, the method 1300 may be performed by a processor 112 (e.g., a microcontroller, a microprocessor, a CPU, a GPU, an auxiliary processing unit, and/or a FPGA, etc., among other processing devices and/or systems that are possible and contemplated herein) executing computer-readable and/or computer-useable program code.

In various embodiments, the method 1300 begins by detecting and/or determining the occurrence of a trigger event (block 1302). The trigger event can include any one or more of the triggers and/or trigger events discussed elsewhere herein. In various embodiments, the trigger event is detected by a trigger module 512 included in a privacy module 108.

The method 1300 further includes determining whether the individual(s) 206 responsible for initiating the trigger event is/are an authorized individual 206 (block 1304). In response to determining that the individual(s) 206 responsible for initiating the trigger event is/are an authorized individual 206 (e.g., a "YES" in block 1304), the method 1300 includes overriding operating the display 106 in privacy mode (block 1306). In various embodiments, overriding the operation of the display 106 in privacy mode is performed by an override module 516 included in a privacy module 108.

In some embodiments, overriding the operation of the display 106 in privacy mode includes operating the display 106 in a normal and/or non-privacy mode. The normal and/or non-privacy mode can include one or more of the various normal modes of operation and/or non-privacy modes of operation discussed elsewhere herein. In various embodiments, a display control module 514 operates the display 106 in the normal and/or non-privacy mode.

In response to determining that the individual(s) 206 is/are not an authorized individual 206 (e.g., a "NO" in block 1304), the method 1300 includes operating a display 106 in privacy mode (block 1308). The privacy mode can include one or more of the various privacy modes discussed elsewhere herein. In various embodiments, a display control module 514 operates the display 106 in the privacy mode.

In some embodiments, an authorized individual 206 is determined utilizing one or more facial recognition algorithms/techniques and/or one or more of the facial comparison/matching techniques discussed elsewhere herein. Further, the one or more facial recognition algorithms/techniques and/or facial comparison/matching techniques can utilize the full face and/or partial face (e.g., one or more eyes) of the individual(s) 206. In various embodiments, determining whether the individual(s) 206 is/are an authorized individual 206 can be performed by a facial module 506.

In additional or alternative embodiments, an authorized individual 206 is determined utilizing one or more vocal recognition algorithms/techniques and/or one or more of the vocal comparison/matching techniques discussed elsewhere herein. In various embodiments, determining whether the individual(s) 206 is/are an authorized individual 206 can be performed by a vocal module 510.

In some embodiments, an individual 206 that is not authorized to view the contents of the display 106 is an individual 206 that is not facially recognized by the one or more facial recognition algorithms/techniques and/or the facial comparison/matching technique(s). In additional or alternative embodiments, an individual 206 that is not authorized to view the contents of the display 106 is an individual 206 that is not vocally recognized by the one or more vocal recognition algorithms/techniques and/or the vocal comparison/matching technique(s).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor of an information handling device; and
a memory that stores code executable by the processor to:
divide a field of view of a camera into one or more authorized zones and one or more unauthorized zones;
detect an individual within an unauthorized zone of the one or more unauthorized zones in the field of view of the camera; and
operate a display in privacy mode in response to detecting the individual within the unauthorized zone is not authorized to be in the unauthorized zone.

2. The apparatus of claim 1, wherein detecting the individual comprises detecting a partial face of the individual within the unauthorized zone.

3. The apparatus of claim 2, wherein detecting the partial face comprises detecting an eye of the individual within the unauthorized zone.

4. The apparatus of claim 1, wherein the one or more unauthorized zones comprise one or more areas in the field of view greater than a predetermined distance behind an authorized user.

5. The apparatus of claim 4, wherein the one or more unauthorized zones comprise one or more of:
- a first area in the field of view that is to a left of the authorized user;
- a second area in the field of view that is to a right of the authorized user; and
- a third area in the field of view that is above the authorized user.

6. The apparatus of claim 1, wherein operating the display in the privacy mode comprises narrowing a viewing angle of the display.

7. The apparatus of claim 6, wherein the viewing angle comprises an angle that is substantially perpendicular to a screen of the display.

8. The apparatus of claim 1, wherein operating the display in the privacy mode comprises reducing a brightness of a screen of the display.

9. The apparatus of claim 1, wherein the code is further executable by the processor to:
- determine that the individual is an authorized user; and
- override operating display in the privacy mode in response to determining that the individual is authorized.

10. The apparatus of claim 9, wherein determining that the individual is authorized comprises:
- utilizing at least one of facial recognition and voice identification to identify the individual; and
- determining that the individual is authorized based on the at least one of the facial recognition and the voice identification matching a corresponding at least one of a learned face and a learned voice for the individual.

11. The apparatus of claim 1, wherein the field of view comprises one of a full field of view and a partial field of view for the camera.

12. The apparatus of claim 1, wherein the code is further executable by the processor to alert an authorized user in response to detecting the individual within the unauthorized zone.

13. A method, comprising:
- dividing a field of view of a camera into one or more authorized zones and one or more unauthorized zones;
- detecting, by a processor, an individual within an unauthorized zone of the one or more unauthorized zones in the field of view of a camera; and
- operating a display in privacy mode in response to detecting the individual within the unauthorized zone is not authorized to be in the unauthorized zone.

14. The method of claim 13, wherein detecting the individual comprises detecting a partial face of the individual within the unauthorized zone.

15. The method of claim 13, wherein the unauthorized zone comprises one or more areas in the field of view greater than a predetermined distance behind an authorized user.

16. The method of claim 15, wherein the one or more unauthorized zones comprise one or more of:
- a first area in the field of view that is to a left of the authorized user;
- a second area in the field of view that is to a right of the authorized user; and
- a third area in the field of view that is above the authorized user.

17. A program product comprising a non-transitory computer-readable storage medium that stores code executable by a processor, the executable code comprising code to perform:
- dividing a field of view of a camera into one or more authorized zones and one or more unauthorized zones;
- detecting an individual within an unauthorized zone of the one or more unauthorized zones in the field of view of a camera; and
- operating a display in privacy mode in response to detecting the individual within the unauthorized zone is not authorized to be in the unauthorized zone.

18. The program product of claim 17, wherein the code to detect the individual comprises code to perform detecting a partial face of the individual within the unauthorized zone.

19. The program product of claim 17, wherein the one or more unauthorized zones comprise one or more areas in the field of view greater than a predetermined distance behind an authorized user.

20. The program product of claim 19, wherein the one or more unauthorized zones comprise one or more of:
- a first area in the field of view that is to a left of the authorized user;
- a second area in the field of view that is to a right of the authorized user; and
- a third area in the field of view that is above the authorized user.

* * * * *